(12) United States Patent
Peng

(10) Patent No.: US 8,297,018 B2
(45) Date of Patent: Oct. 30, 2012

(54) PACKAGING PREFINISHED FIBER CEMENT PRODUCTS

(75) Inventor: Weiling Peng, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 944 days.

(21) Appl. No.: 10/620,711

(22) Filed: Jul. 16, 2003

(65) Prior Publication Data

US 2004/0086676 A1    May 6, 2004

Related U.S. Application Data

(60) Provisional application No. 60/396,303, filed on Jul. 16, 2002.

(51) Int. Cl.
*E04B 9/00* (2006.01)
(52) U.S. Cl. ...... 52/446; 52/309.15; 428/41.7; 428/41.8
(58) Field of Classification Search .............. 52/309.13, 52/309.15, 404.1, 506.01, 446, 311.1; 428/40.1, 428/41.7, 41.8
See application file for complete search history.

(56) References Cited

U.S. PATENT DOCUMENTS

| | | | |
|---|---|---|---|
| 369,216 A | 8/1887 | Temple |
| 494,763 A | 4/1893 | Smidth |
| 525,442 A | 9/1894 | Burrows |
| 575,074 A | 1/1897 | Smith |
| 774,114 A | 11/1904 | Spear |
| 815,801 A | 3/1906 | Depew et al. |
| 1,399,023 A | 12/1921 | Murray |
| 1,510,497 A | 10/1924 | Keller |
| 1,630,801 A | 5/1927 | Parsons |
| 1,634,809 A | 7/1927 | Weiss |
| 1,698,557 A | 1/1929 | O'Brien |
| 1,856,932 A | 5/1932 | Shaw |
| 1,856,936 A | 5/1932 | Turner |
| 1,871,843 A | 8/1932 | Ericson |
| 1,930,024 A | 10/1933 | Varden |
| 1,943,663 A | 1/1934 | Ericson |
| 1,959,519 A | 5/1934 | Black |
| 1,976,684 A | 10/1934 | Munroe et al. |
| 1,976,984 A | 10/1934 | Condon et al. |

(Continued)

FOREIGN PATENT DOCUMENTS

AU    515151    7/1980

(Continued)

OTHER PUBLICATIONS

International Search Report for corresponding International Application No. PCT/US03/22656.

(Continued)

*Primary Examiner* — William Gilbert
(74) *Attorney, Agent, or Firm* — Knobbe, Martens, Olson & Bear, LLP

(57) ABSTRACT

Protected prefinished fiber cement products are manufactured by applying a protective layer on the finished surface of a fiber cement product. The protective layer protects the finish layer of the prefinished fiber cement product during handling, storage, and transport. Removing the protective layer leaves no adhesive residue on the finish layer, does not damage the finish layer, and does not substantially tear the protective layer. Protected prefinished fiber cement products are typically stacked on pallets for storage and transport. Optionally, spacers may be placed between the stacked protected prefinished fiber cement products.

5 Claims, 7 Drawing Sheets

U.S. PATENT DOCUMENTS

| | | | |
|---|---|---|---|
| 1,978,519 A | 10/1934 | Willock et al. | |
| 1,995,393 A | 3/1935 | Manske | |
| 1,997,939 A | 4/1935 | Loucks | |
| 2,009,619 A | 7/1935 | Huffine | |
| 2,062,149 A | 11/1936 | Stark et al. | |
| 2,082,791 A | 6/1937 | Copeman | |
| 2,182,372 A | 12/1939 | Cox et al. | |
| 2,224,351 A | 12/1940 | Kaye | |
| 2,253,753 A | 8/1941 | Black | |
| 2,276,170 A | 3/1942 | Elmendorf | |
| 2,317,634 A | 4/1943 | Olsen | |
| 2,320,702 A | 6/1943 | Marchese et al. | |
| 2,323,230 A | 6/1943 | McAvoy | |
| 2,324,325 A | 7/1943 | Schuh | |
| 2,354,639 A | 7/1944 | Seymour | |
| 2,400,357 A | 5/1946 | Krajci | |
| 2,413,794 A | 1/1947 | Small | |
| 2,447,275 A | 8/1948 | Price | |
| 2,511,083 A | 6/1950 | Small | |
| 2,517,122 A | 8/1950 | Lockwood | |
| 2,966,260 A | 8/1950 | Camp | |
| 2,624,298 A | 1/1953 | Farren | |
| 2,694,025 A | 11/1954 | Slayter et al. | |
| 2,724,872 A | 11/1955 | Herbes | |
| 2,782,463 A | 2/1957 | Bergvall et al. | |
| 2,928,143 A | 3/1960 | Newton | |
| 2,956,310 A | 10/1960 | Roop et al. | |
| 2,518,281 A | 12/1960 | Johnson | |
| 3,046,700 A | 7/1962 | Davenport | |
| 3,047,985 A | 8/1962 | Murphy | |
| 3,106,503 A | 10/1963 | Frobisher | |
| 3,111,450 A | 11/1963 | Stevens | |
| 3,133,854 A | 5/1964 | Simms | |
| 3,173,229 A | 3/1965 | Weber | |
| 3,181,662 A | 5/1965 | Maertzig, Jr. | |
| 3,214,876 A | 11/1965 | Mattes | |
| 3,228,823 A | 1/1966 | Usala et al. | |
| 3,235,039 A | 2/1966 | O'Donnell | |
| 3,236,932 A | 2/1966 | Grigas et al. | |
| 3,274,743 A | 9/1966 | Blum, Jr. | |
| 3,284,980 A | 11/1966 | Dinkel | |
| 3,288,823 A | 11/1966 | Vanderwerff | |
| 3,313,675 A | 4/1967 | Petropoulos et al. | |
| 3,333,379 A | 8/1967 | Harris | |
| 3,336,710 A | 8/1967 | Raynes | |
| 3,358,355 A * | 12/1967 | Youssi et al. | 29/424 |
| 3,408,786 A | 11/1968 | Snyker | |
| 3,415,019 A | 12/1968 | Andersen | |
| 3,416,275 A | 12/1968 | Van Loghem et al. | |
| 3,419,461 A | 12/1968 | Gebhard, Jr. et al. | |
| 3,421,281 A | 1/1969 | Harris | |
| 3,452,861 A * | 7/1969 | Erwin | 206/389 |
| 3,475,261 A | 10/1969 | Ettore et al. | |
| 3,481,093 A | 12/1969 | Davidson | |
| 3,492,194 A | 1/1970 | Rauch | |
| 3,527,004 A | 9/1970 | Sorenson | |
| 3,606,720 A | 9/1971 | Cookson | |
| 3,616,173 A | 10/1971 | Green et al. | |
| 3,625,808 A | 12/1971 | Martin | |
| 3,635,742 A | 1/1972 | Fujimasu | |
| 3,660,955 A | 5/1972 | Simon et al. | |
| 3,663,341 A | 5/1972 | Veneziale, Jr. | |
| 3,663,353 A | 5/1972 | Long et al. | |
| 3,703,795 A | 11/1972 | Mattes | |
| 3,708,943 A | 1/1973 | Thomas et al. | |
| 3,723,171 A | 3/1973 | Fuchs | |
| 3,729,368 A | 4/1973 | Ingham et al. | |
| 3,738,900 A | 6/1973 | Matzke | |
| 3,754,365 A | 8/1973 | Carrick et al. | |
| 3,780,483 A | 12/1973 | Mattes | |
| 3,782,985 A | 1/1974 | Gebhardt | |
| 3,797,179 A | 3/1974 | Jackson | |
| 3,797,190 A | 3/1974 | Widdowson | |
| 3,804,058 A | 4/1974 | Messenger | |
| 3,818,668 A | 6/1974 | Charniga | |
| 3,835,604 A | 9/1974 | Hoffmann, Jr. | |
| 3,847,633 A | 11/1974 | Race | |
| 3,866,378 A | 2/1975 | Kessler | |
| 3,869,295 A | 3/1975 | Bowles et al. | |
| 3,888,617 A | 6/1975 | Barnett | |
| 3,902,911 A | 9/1975 | Messenger | |
| 3,921,346 A | 11/1975 | Sauer et al. | |
| 3,928,701 A | 12/1975 | Roehner | |
| 3,965,633 A | 6/1976 | Carroll | |
| 3,974,024 A | 8/1976 | Yano et al. | |
| 3,986,312 A | 10/1976 | Calhoun et al. | |
| 3,992,845 A | 11/1976 | Grzesiek et al. | |
| 4,010,587 A | 3/1977 | Larsen | |
| 4,010,589 A | 3/1977 | Gross | |
| 4,015,392 A | 4/1977 | Eaton | |
| 4,028,859 A | 6/1977 | Bellagamba et al. | |
| 4,034,528 A | 7/1977 | Sanders et al. | |
| 4,047,355 A | 9/1977 | Knorr | |
| 4,052,829 A | 10/1977 | Chapman | |
| 4,058,944 A | 11/1977 | Rieger et al. | |
| 4,063,393 A | 12/1977 | Toti | |
| 4,065,899 A | 1/1978 | Kirkhuff | |
| 4,070,843 A | 1/1978 | Leggiere et al. | |
| 4,076,884 A | 2/1978 | Riley et al. | |
| 4,079,562 A | 3/1978 | Englert et al. | |
| 4,082,830 A | 4/1978 | Cogliano | |
| 4,101,335 A | 7/1978 | Barrable et al. | |
| 4,102,106 A | 7/1978 | Golder et al. | |
| 4,104,103 A | 8/1978 | Tarullo | |
| 4,104,840 A | 8/1978 | Heintz et al. | |
| 4,110,507 A | 8/1978 | Colledge | |
| 4,112,647 A | 9/1978 | Scheid | |
| 4,117,185 A | 9/1978 | Cummins et al. | |
| 4,118,236 A | 10/1978 | Erskine | |
| 4,128,696 A | 12/1978 | Goebel et al. | |
| 4,132,555 A | 1/1979 | Barrable | |
| 4,150,517 A | 4/1979 | Warner, Sr. | |
| 4,152,878 A | 5/1979 | Balinski | |
| 4,166,749 A | 9/1979 | Sterrett et al. | |
| 4,183,188 A | 1/1980 | Goldsby | |
| 4,184,906 A | 1/1980 | Young | |
| 4,187,658 A | 2/1980 | Reinwall, Jr. | |
| 4,203,788 A | 5/1980 | Clear | |
| 4,211,525 A | 7/1980 | Vetter et al. | |
| 4,222,785 A | 9/1980 | Henderson | |
| 4,231,573 A | 11/1980 | Kelly | |
| 4,268,317 A | 5/1981 | Rayl | |
| 4,274,239 A | 6/1981 | Carroll | |
| 4,292,364 A | 9/1981 | Wesch et al. | |
| 4,298,647 A | 11/1981 | Cancio et al. | |
| 4,307,551 A | 12/1981 | Crandell | |
| 4,321,780 A | 3/1982 | Hooper et al. | |
| 4,327,528 A | 5/1982 | Fritz | |
| 4,337,290 A | 6/1982 | Kelly et al. | |
| 4,339,489 A | 7/1982 | Barker et al. | |
| 4,343,127 A | 8/1982 | Greve et al. | |
| 4,361,616 A | 11/1982 | Bomers | |
| 4,362,566 A | 12/1982 | Hinterwaldner et al. | |
| 4,366,657 A | 1/1983 | Hopman | |
| 4,370,166 A | 1/1983 | Powers et al. | |
| 4,373,955 A | 2/1983 | Bouchard et al. | |
| 4,373,957 A | 2/1983 | Pedersen et al. | |
| 4,377,977 A | 3/1983 | Wurster | |
| 4,379,553 A | 4/1983 | Kelly | |
| 4,380,564 A | 4/1983 | Cancio et al. | |
| 4,392,336 A | 7/1983 | Ganssle | |
| 4,399,643 A | 8/1983 | Hafner | |
| 4,404,057 A * | 9/1983 | Morrison et al. | 156/324 |
| 4,406,703 A | 9/1983 | Guthrie et al. | |
| 4,420,351 A | 12/1983 | Lussi et al. | |
| 4,424,261 A | 1/1984 | Keeling et al. | |
| 4,429,214 A | 1/1984 | Brindley et al. | |
| 4,434,119 A * | 2/1984 | Teare | 264/145 |
| 4,441,944 A | 4/1984 | Massey | |
| 4,442,219 A | 4/1984 | TenEyck et al. | |
| 4,462,730 A | 7/1984 | Knohl | |
| 4,462,835 A | 7/1984 | Car et al. | |
| 4,463,043 A | 7/1984 | Reeves et al. | |
| 4,463,532 A | 8/1984 | Faw | |
| 4,465,729 A | 8/1984 | Cancio et al. | |
| 4,501,830 A | 2/1985 | Miller et al. | |
| 4,502,256 A | 3/1985 | Hahn et al. | |

| Patent | Date | Inventor |
|---|---|---|
| 4,504,320 A | 3/1985 | Rizer et al. |
| 4,506,486 A | 3/1985 | Culpepper, Jr. et al. |
| 4,511,626 A | 4/1985 | Schumacher |
| 4,514,947 A | 5/1985 | Grail |
| 4,553,366 A | 11/1985 | Guerin et al. |
| 4,559,894 A | 12/1985 | Thompson |
| 4,586,304 A | 5/1986 | Flammand et al. |
| 4,588,443 A | 5/1986 | Bache |
| 4,592,185 A | 6/1986 | Lynch et al. |
| 4,626,398 A | 12/1986 | Vetter et al. |
| 4,637,860 A | 1/1987 | Harper et al. |
| 4,640,715 A | 2/1987 | Heitzmann et al. |
| 4,641,469 A | 2/1987 | Wood |
| 4,642,137 A | 2/1987 | Heitzmann et al. |
| 4,661,398 A | 4/1987 | Ellis |
| 4,670,079 A | 6/1987 | Thompson |
| 4,673,659 A | 6/1987 | Wood et al. |
| 4,680,059 A | 7/1987 | Cook et al. |
| 4,685,263 A | 8/1987 | Ting |
| 4,698,942 A | 10/1987 | Swartz |
| 4,728,710 A | 3/1988 | Goel |
| 4,730,398 A | 3/1988 | Stanton |
| 4,737,191 A | 4/1988 | Meynarddi |
| 4,748,771 A | 6/1988 | Lehnert et al. |
| 4,779,313 A | 10/1988 | Gonas |
| 4,780,141 A | 10/1988 | Double et al. |
| 4,789,604 A | 12/1988 | van der Hoeven et al. |
| 4,793,861 A | 12/1988 | Sohm et al. |
| 4,803,105 A | 2/1989 | Kretow et al. |
| 4,808,229 A | 2/1989 | Arhelger et al. |
| 4,811,538 A | 3/1989 | Lehnert et al. |
| 4,827,621 A | 5/1989 | Borsuk |
| 4,840,672 A | 6/1989 | Baes |
| 4,841,702 A | 6/1989 | Huettemann |
| 4,842,649 A | 6/1989 | Heitzmann et al. |
| 4,854,101 A | 8/1989 | Champagne |
| 4,858,402 A | 8/1989 | Putz |
| 4,866,896 A | 9/1989 | Shreiner et al. |
| 4,870,788 A | 10/1989 | Hassan |
| 4,876,827 A | 10/1989 | Williams |
| 4,894,102 A | 1/1990 | Halls et al. |
| 4,895,598 A | 1/1990 | Hedberg et al. |
| 4,906,408 A | 3/1990 | Bouniol |
| 4,914,885 A | 4/1990 | Baker et al. |
| 4,924,644 A | 5/1990 | Lewis |
| 4,927,696 A | 5/1990 | Berg et al. |
| 4,930,287 A | 6/1990 | Volk et al. |
| 4,937,993 A | 7/1990 | Hitchins et al. |
| 4,952,631 A | 8/1990 | McAlpin et al. |
| 4,955,169 A | 9/1990 | Shisko et al. |
| 4,963,430 A | 10/1990 | Kish et al. |
| 4,969,250 A | 11/1990 | Hickman et al. |
| 4,969,302 A | 11/1990 | Coggan et al. |
| 4,975,396 A | 12/1990 | Thiery |
| 4,985,119 A | 1/1991 | Vinson et al. |
| 4,995,605 A | 2/1991 | Conville |
| 4,999,056 A | 3/1991 | Rasmussen |
| 5,017,232 A | 5/1991 | Miceli |
| 5,022,207 A | 6/1991 | Hartnett |
| 5,045,378 A | 9/1991 | Libby |
| 5,047,086 A | 9/1991 | Hayakawa et al. |
| 5,067,675 A | 11/1991 | Brant et al. |
| D322,678 S | 12/1991 | Brathwaite |
| 5,076,986 A | 12/1991 | Delvaux et al. |
| 5,077,952 A | 1/1992 | Moure |
| 5,080,022 A | 1/1992 | Carlson |
| 5,098,498 A | 3/1992 | Hale et al. |
| 5,106,557 A | 4/1992 | Rirsch et al. |
| 5,108,679 A | 4/1992 | Rirsch et al. |
| 5,112,405 A | 5/1992 | Sanchez |
| 5,114,617 A | 5/1992 | Smetana et al. |
| 5,115,621 A | 5/1992 | Kobayashi et al. |
| 5,117,600 A | 6/1992 | Yerushalmi et al. |
| 5,143,780 A | 9/1992 | Balassa |
| 5,155,958 A | 10/1992 | Huff |
| 5,167,710 A | 12/1992 | Leroux et al. |
| 5,177,305 A | 1/1993 | Pichat et al. |
| 5,178,924 A * | 1/1993 | Johnson et al. .............. 428/41.4 |
| 5,198,052 A | 3/1993 | Ali |
| 5,198,275 A | 3/1993 | Klein |
| 5,210,989 A | 5/1993 | Jakel |
| 5,226,274 A | 7/1993 | Sommerstein |
| 5,229,437 A | 7/1993 | Knight |
| 5,234,754 A | 8/1993 | Bache |
| D339,642 S | 9/1993 | Blazley et al. |
| 5,242,736 A | 9/1993 | Van Erden et al. |
| 5,244,318 A | 9/1993 | Arai et al. |
| 5,245,811 A | 9/1993 | Knorr |
| 5,247,773 A | 9/1993 | Weir |
| 5,252,526 A | 10/1993 | Whittemore |
| 5,259,872 A | 11/1993 | Shinozaki et al. |
| 5,268,226 A | 12/1993 | Sweeney |
| 5,282,317 A | 2/1994 | Carter et al. |
| 5,297,370 A | 3/1994 | Greenstreet et al. |
| 5,301,484 A | 4/1994 | Jansson |
| 5,305,568 A | 4/1994 | Beckerman |
| 5,305,577 A | 4/1994 | Richards et al. |
| 5,319,909 A | 6/1994 | Singleterry |
| 5,323,581 A | 6/1994 | Jakel |
| 5,330,573 A | 7/1994 | Nakano et al. |
| 5,334,242 A | 8/1994 | O'Toole |
| 5,338,349 A | 8/1994 | Farrar |
| 5,349,802 A | 9/1994 | Kariniemi |
| 5,352,288 A | 10/1994 | Mallow |
| 5,352,290 A | 10/1994 | Takeshita et al. |
| 5,355,649 A | 10/1994 | Berridge |
| 5,358,676 A | 10/1994 | Jennings et al. |
| 5,369,924 A | 12/1994 | Neudorf et al. |
| 5,372,678 A | 12/1994 | Sagstetter et al. |
| 5,378,279 A | 1/1995 | Conroy |
| 5,391,245 A | 2/1995 | Turner |
| 5,394,672 A | 3/1995 | Seem |
| 5,395,672 A | 3/1995 | Pingaud |
| 5,395,685 A | 3/1995 | Seth et al. |
| 5,397,631 A | 3/1995 | Green et al. |
| 5,410,852 A | 5/1995 | Edgar et al. |
| 5,425,985 A | 6/1995 | Irvin |
| 5,425,986 A | 6/1995 | Guyette |
| 5,428,931 A | 7/1995 | Ragsdale |
| 5,437,934 A | 8/1995 | Witt et al. |
| 5,443,603 A | 8/1995 | Kirkendall |
| 5,461,839 A | 10/1995 | Beck |
| 5,465,547 A | 11/1995 | Jakel |
| 5,475,961 A | 12/1995 | Menchetti |
| 5,477,617 A | 12/1995 | Guy |
| 5,482,550 A | 1/1996 | Strait |
| 5,501,050 A | 3/1996 | Ruel et al. |
| 5,511,316 A | 4/1996 | Fischer et al. |
| 5,517,795 A | 5/1996 | Doke |
| 5,522,926 A | 6/1996 | Richard et al. |
| 5,522,986 A | 6/1996 | Shi et al. |
| 5,526,627 A | 6/1996 | Beck |
| 5,531,824 A | 7/1996 | Burkes et al. |
| 5,545,297 A | 8/1996 | Andersen et al. |
| 5,557,903 A | 9/1996 | Haddock |
| 5,561,173 A | 10/1996 | Dry |
| 5,564,233 A | 10/1996 | Norton |
| 5,564,245 A | 10/1996 | Rademacher |
| 5,565,026 A | 10/1996 | Hense et al. |
| 5,580,378 A | 12/1996 | Shulman |
| 5,580,409 A | 12/1996 | Andersen et al. |
| 5,598,671 A | 2/1997 | Ting |
| 5,603,758 A | 2/1997 | Schreifels, Jr. et al. |
| 5,603,798 A | 2/1997 | Bhat |
| 5,617,690 A | 4/1997 | Gibbs |
| 5,622,556 A | 4/1997 | Shulman |
| 5,631,097 A | 5/1997 | Andersen et al. |
| 5,634,314 A | 6/1997 | Champagne |
| 5,648,144 A | 7/1997 | Maurer et al. |
| 5,651,227 A | 7/1997 | Anderson |
| 5,656,121 A | 8/1997 | Fukushi |
| 5,658,670 A | 8/1997 | Fukushi et al. |
| 5,661,939 A | 9/1997 | Coulis et al. |
| 5,673,489 A | 10/1997 | Robell |
| 5,673,529 A | 10/1997 | Treister et al. |
| 5,675,955 A | 10/1997 | Champagne |
| 5,692,345 A | 12/1997 | Mogaki et al. |
| 5,694,727 A | 12/1997 | Dobija |

| | | | | | | |
|---|---|---|---|---|---|---|
| 5,697,189 | A | 12/1997 | Miller et al. | 6,226,947 B1 | 5/2001 | Bado et al. |
| D388,884 | S | 1/1998 | Karnoski | 6,276,107 B1 | 8/2001 | Waggoner et al. |
| 5,714,002 | A | 2/1998 | Styron | 6,277,189 B1 | 8/2001 | Chugh |
| 5,718,758 | A | 2/1998 | Breslauer | 6,290,769 B1 | 9/2001 | Carkner |
| 5,718,759 | A | 2/1998 | Stav et al. | 6,295,777 B1 | 10/2001 | Hunter et al. |
| 5,724,783 | A | 3/1998 | Mandish | 6,298,626 B2 | 10/2001 | Rudden |
| 5,725,652 | A | 3/1998 | Shulman | 6,308,486 B1 | 10/2001 | Medland et al. |
| 5,728,246 | A | 3/1998 | Ewaschuk | 6,315,489 B1 | 11/2001 | Watanabe |
| 5,729,946 | A | 3/1998 | Beck | 6,316,087 B1 | 11/2001 | Lehan |
| 5,732,520 | A | 3/1998 | Maietta | 6,319,456 B1 | 11/2001 | Gilbert et al. |
| 5,735,092 | A | 4/1998 | Clayton et al. | 6,324,807 B1 | 12/2001 | Ishiko |
| 5,735,094 | A | 4/1998 | Zember | 6,346,146 B1 | 2/2002 | Duselis et al. |
| 5,736,594 | A | 4/1998 | Boles et al. | 6,357,193 B1 | 3/2002 | Morris |
| 5,741,844 | A | 4/1998 | Nass et al. | 6,365,081 B1 | 4/2002 | Beck |
| 5,743,056 | A | 4/1998 | Balla-Goddard et al. | 6,367,208 B1 | 4/2002 | Campbell et al. |
| 5,749,187 | A | 5/1998 | Umehara et al. | 6,367,220 B1 | 4/2002 | Krause et al. |
| 5,759,654 | A | 6/1998 | Cahill | 6,415,574 B2 | 7/2002 | Beck |
| 5,759,695 | A | 6/1998 | Primeaux | 6,421,973 B1 | 7/2002 | Gregg et al. |
| 5,768,841 | A | 6/1998 | Swartz et al. | 6,423,167 B1 | 7/2002 | Palmer et al. |
| 5,791,109 | A | 8/1998 | Lehnert et al. | 6,423,168 B1 | 7/2002 | Valiulis |
| 5,795,654 | A | 8/1998 | Koishi et al. | 6,425,218 B1 | 7/2002 | Doyon et al. |
| 5,802,790 | A | 9/1998 | Lamont et al. | 6,430,885 B1 | 8/2002 | Ito et al. |
| 5,817,262 | A | 10/1998 | Englert | 6,488,792 B2 | 12/2002 | Mathieu et al. |
| 5,842,280 | A | 12/1998 | Robell | 6,510,667 B1 | 1/2003 | Cottier et al. |
| 5,848,508 | A | 12/1998 | Albrecht | 6,514,624 B2 | 2/2003 | Takemoto et al. |
| 5,848,509 | A | 12/1998 | Knapp et al. | 6,516,580 B1 | 2/2003 | Maietta |
| 5,855,977 | A | 1/1999 | Fukushi et al. | 6,526,717 B2 | 3/2003 | Waggoner et al. |
| 5,857,303 | A | 1/1999 | Beck et al. | 6,539,643 B1 | 4/2003 | Gleeson |
| 5,861,211 | A | 1/1999 | Thakkar et al. | 6,550,203 B1 | 4/2003 | Little |
| 5,863,657 | A | 1/1999 | Kawashima et al. | 6,550,210 B1 | 4/2003 | Levine et al. |
| 5,878,543 | A | 3/1999 | Mowery | 6,551,694 B1 | 4/2003 | Imamichi et al. |
| 5,887,403 | A | 3/1999 | Beck | 6,562,444 B1 | 5/2003 | Gleeson et al. |
| 5,891,374 | A | 4/1999 | Shah et al. | 6,572,697 B2 | 6/2003 | Gleeson et al. |
| 5,891,516 | A | 4/1999 | Gstrein et al. | 6,599,599 B1 * | 7/2003 | Buckwater et al. .......... 428/40.1 |
| 5,908,704 | A | 6/1999 | Friedman et al. | 6,610,358 B1 | 8/2003 | Williams et al. |
| 5,916,095 | A | 6/1999 | Tamlyn | 6,623,805 B2 | 9/2003 | Caroline et al. |
| 5,924,213 | A | 7/1999 | Lee | 6,626,947 B2 | 9/2003 | Lestor et al. |
| 5,928,777 | A | 7/1999 | Cox et al. | 6,676,745 B2 | 1/2004 | Merkley et al. |
| 5,935,699 | A | 8/1999 | Barber | 6,679,011 B2 | 1/2004 | Beck et al. |
| 5,945,208 | A | 8/1999 | Richards et al. | 6,689,451 B1 | 2/2004 | Peng et al. |
| 5,946,870 | A | 9/1999 | Bifano et al. | 6,699,576 B2 | 3/2004 | Peng et al. |
| 5,946,876 | A | 9/1999 | Grace, Sr. et al. | D489,137 S | 4/2004 | Eichner et al. |
| 5,950,319 | A | 9/1999 | Harris | D489,463 S | 5/2004 | Barnett |
| 5,968,257 | A | 10/1999 | Ahrens | 6,737,008 B1 | 5/2004 | Gilbert et al. |
| 5,979,135 | A | 11/1999 | Reeves | D492,424 S | 6/2004 | Barnett |
| 5,987,838 | A | 11/1999 | Beck | 6,760,978 B2 | 7/2004 | Gleeson |
| 6,000,185 | A | 12/1999 | Beck et al. | 6,901,713 B2 | 6/2005 | Axsom |
| 6,012,255 | A | 1/2000 | Smid et al. | 6,913,819 B2 | 7/2005 | Wallner |
| 6,018,924 | A | 2/2000 | Tamlyn | 6,941,720 B2 | 9/2005 | DeFord et al. |
| 6,020,429 | A | 2/2000 | Yang et al. | 6,949,160 B2 * | 9/2005 | Weiss et al. .................... 156/247 |
| 6,026,616 | A | 2/2000 | Gibson | D517,226 S | 3/2006 | Zarb |
| 6,029,415 | A | 2/2000 | Culpepper et al. | D517,703 S | 3/2006 | Zarb |
| 6,030,447 | A | 2/2000 | Naji et al. | D518,186 S | 3/2006 | Zarb |
| 6,045,922 | A | 4/2000 | Janssen et al. | D518,579 S | 4/2006 | Zarb |
| 6,046,269 | A | 4/2000 | Nass et al. | 7,028,436 B2 | 4/2006 | Bezubic, Jr. |
| 6,049,987 | A | 4/2000 | Robell | D521,657 S | 5/2006 | Zarb |
| 6,055,787 | A | 5/2000 | Gerhaher | D524,454 S | 7/2006 | Zarb |
| 6,063,856 | A | 5/2000 | Mass | 7,089,709 B2 | 8/2006 | Waggoner et al. |
| 6,079,175 | A | 6/2000 | Clear | D528,669 S | 9/2006 | Zarb |
| 6,083,335 | A | 7/2000 | Scullin et al. | D529,629 S | 10/2006 | Zarb |
| 6,084,011 | A | 7/2000 | Lucero et al. | D529,630 S | 10/2006 | Zarb |
| 6,093,473 | A | 7/2000 | Min | D529,633 S | 10/2006 | Zarb |
| 6,110,525 | A | 8/2000 | Stoddard | 7,191,570 B1 | 3/2007 | Eaton et al. |
| 6,122,876 | A | 9/2000 | Bado et al. | 7,323,076 B2 | 1/2008 | Peng et al. |
| 6,122,877 | A | 9/2000 | Hendrickson et al. | 7,325,325 B2 | 2/2008 | Gleeson |
| 6,124,044 | A | 9/2000 | Swidler | 2001/0047741 A1 | 12/2001 | Gleeson et al. |
| 6,134,855 | A | 10/2000 | Beck | 2002/0100249 A1 | 8/2002 | Peng et al. |
| 6,138,430 | A | 10/2000 | Van Acoleyen et al. | 2002/0139082 A1 | 10/2002 | DeFord et al. |
| 6,139,620 | A | 10/2000 | Suzuki et al. | 2002/0169271 A1 | 11/2002 | Peng |
| 6,145,255 | A | 11/2000 | Allaster | 2002/0195191 A1 * | 12/2002 | Weiss et al. .................... 156/247 |
| 6,161,353 | A | 12/2000 | Negola et al. | 2003/0046891 A1 | 3/2003 | Colada et al. |
| 6,161,354 | A | 12/2000 | Gilbert et al. | 2003/0054123 A1 | 3/2003 | Black et al. |
| 6,164,032 | A | 12/2000 | Beck | 2003/0056458 A1 | 3/2003 | Black et al. |
| 6,164,214 | A | 12/2000 | Smorgon et al. | 2003/0089061 A1 | 5/2003 | DeFord et al. |
| 6,170,212 | B1 | 1/2001 | Suchyna et al. | 2003/0172606 A1 | 9/2003 | Anderson |
| 6,170,214 | B1 | 1/2001 | Treister et al. | 2003/0200721 A1 | 10/2003 | Gleeson et al. |
| 6,170,215 | B1 | 1/2001 | Nasi | 2004/0086676 A1 | 5/2004 | Peng |
| 6,176,920 | B1 | 1/2001 | Murphy et al. | 2004/0103610 A1 | 6/2004 | Axsom |
| 6,195,952 | B1 | 3/2001 | Culpepper et al. | 2004/0163331 A1 | 8/2004 | Peng et al. |

| | | | |
|---|---|---|---|
| 2005/0000172 A1 | 1/2005 | Anderson | |
| 2005/0138865 A1 | 6/2005 | Gleeson et al. | |
| 2005/0210790 A1 | 9/2005 | Wallner | |
| 2005/0262799 A1 | 12/2005 | Gleeson et al. | |
| 2005/0284339 A1 | 12/2005 | Brunton et al. | |
| 2006/0010800 A1 | 1/2006 | Bezubic, Jr. | |
| 2007/0196611 A1 | 8/2007 | Chen et al. | |

FOREIGN PATENT DOCUMENTS

| | | |
|---|---|---|
| AU | 70389/81 | 10/1981 |
| AU | 8401582 | 2/1983 |
| AU | 88589/82 | 3/1983 |
| AU | 94035 S | 11/1986 |
| AU | 95878 S | 3/1987 |
| AU | 98800 S | 12/1987 |
| AU | 99683 S | 2/1988 |
| AU | 102662 S | 1/1989 |
| AU | 103840 S | 5/1989 |
| AU | 104552 S | 8/1989 |
| AU | 46878/89 | 7/1990 |
| AU | 108078 S | 7/1990 |
| AU | 616088 | 7/1990 |
| AU | 110320 S | 2/1991 |
| AU | 643726 | 8/1991 |
| AU | B-7620/91 | 6/1992 |
| AU | B-76201/91 | 6/1992 |
| AU | 199215903 | 4/1993 |
| AU | 117138 S | 5/1993 |
| AU | 118448 S | 10/1993 |
| AU | 118862 S | 11/1993 |
| AU | 686135 | 11/1994 |
| AU | 677649 | 12/1994 |
| AU | 122634 S | 2/1995 |
| AU | 123141 S | 4/1995 |
| AU | 123142 S | 4/1995 |
| AU | 681049 | 9/1996 |
| AU | A-52126 / 96 | 11/1996 |
| AU | 130941 S | 8/1997 |
| AU | 132812 S | 2/1998 |
| AU | 732998 | 5/1998 |
| AU | 6292698 | 8/1998 |
| AU | 135097 S | 9/1998 |
| AU | 135557 S | 11/1998 |
| AU | 137291 S | 5/1999 |
| AU | 9768198 | 5/1999 |
| AU | 199886116 | 5/1999 |
| AU | 137791 S | 7/1999 |
| AU | 99/26061 | 9/1999 |
| AU | 99/52711 | 3/2000 |
| AU | 140607 S | 5/2000 |
| AU | 00/78752 | 4/2001 |
| AU | 00/78753 | 4/2001 |
| AU | 00/78733 | 5/2001 |
| AU | 200111200 | 5/2001 |
| AU | 01/21275 | 6/2001 |
| AU | 783430 | 6/2001 |
| AU | 200072012 | 6/2001 |
| AU | 735352 | 7/2001 |
| AU | 37683 / 01 | 9/2001 |
| AU | 01/43991 | 10/2001 |
| AU | 00/53659 | 3/2002 |
| AU | 147568 S | 4/2002 |
| AU | 2001287356 | 4/2002 |
| AU | 148485 S | 7/2002 |
| AU | 200223229 | 11/2002 |
| AU | 2002301041 | 6/2003 |
| AU | 2002301511 A1 | 6/2003 |
| AU | 2003204739 | 7/2003 |
| AU | 152915 S | 8/2003 |
| AU | 153491 S | 10/2003 |
| AU | 153493 S | 10/2003 |
| AU | 153494 S | 10/2003 |
| AU | 153495 S | 10/2003 |
| AU | 153496 S | 10/2003 |
| AU | 2003204418 | 12/2003 |
| AU | 2003238481 | 12/2003 |
| AU | 2003256630 A1 | 2/2004 |
| AU | 2003257906 | 7/2004 |
| AU | 2003271286 | 7/2004 |
| AU | 2004204092 | 7/2004 |
| AU | 2003268882 | 8/2004 |
| AU | 2004101018 | 12/2004 |
| AU | 2004200339 | 6/2005 |
| AU | 2004233526 | 6/2005 |
| AU | 2001250832 | 4/2006 |
| AU | 2002211394 | 4/2006 |
| AU | 2002218649 | 4/2006 |
| AU | 2003266828 | 4/2006 |
| CA | 730345 A | 3/1966 |
| CA | 1080601 | 7/1980 |
| CA | 1084230 | 8/1980 |
| CA | 2313456 | 6/1999 |
| CH | 368918 | 4/1963 |
| CH | 606674 | 11/1978 |
| CH | 678882 | 11/1991 |
| CH | 684285 | 8/1994 |
| CN | 1081168 | 1/1994 |
| CN | 2281378 | 5/1998 |
| DE | 1952082 | 12/1966 |
| DE | 2460879 | 6/1976 |
| DE | 2460880 | 6/1976 |
| DE | 2610998 | 9/1977 |
| DE | 3210326 | 9/1983 |
| DE | 3232106 | 3/1984 |
| DE | 3505335 | 8/1986 |
| DE | 3621010 | 1/1988 |
| DE | 3932176 | 6/1990 |
| DE | 3923800 | 1/1991 |
| DE | 4004103 | 8/1991 |
| DE | 4104919 | 8/1992 |
| DE | 4209834 | 9/1993 |
| DE | 4228338 | 10/1993 |
| DE | 9403018 | 5/1994 |
| DE | 19858342 | 2/2000 |
| DE | 20006112 | 7/2000 |
| DE | 19549535 | 1/2001 |
| DE | 199 38 806 A1 | 2/2001 |
| EP | 0055504 | 7/1982 |
| EP | 0103097 | 3/1984 |
| EP | 0173553 | 3/1986 |
| EP | 0184477 | 6/1986 |
| EP | 0220073 | 4/1987 |
| EP | 0222339 | 5/1987 |
| EP | 0305209 | 3/1989 |
| EP | 0347092 | 12/1989 |
| EP | 0428431 | 5/1991 |
| EP | 0430667 | 6/1991 |
| EP | 0482810 | 4/1992 |
| EP | 0484283 | 5/1992 |
| EP | 0558239 | 9/1993 |
| EP | 0564447 | 10/1993 |
| EP | 0625618 | 11/1994 |
| EP | 0683282 | 11/1995 |
| EP | 0708213 | 4/1996 |
| EP | 0 827 563 B1 | 3/1999 |
| EP | 0686501 A1 | 3/1999 |
| EP | 1094165 A2 | 4/2001 |
| EP | 03764818.5-2124 | 12/2006 |
| FR | 990242 | 9/1951 |
| FR | 2248246 | 5/1975 |
| FR | 2405908 | 5/1979 |
| FR | 2451428 | 11/1980 |
| FR | 2540160 | 8/1984 |
| FR | 2562591 | 10/1985 |
| FR | 2624870 | 6/1989 |
| FR | 2628775 | 9/1989 |
| FR | 2702790 | 9/1994 |
| GB | 119182 | 9/1918 |
| GB | 558239 | 12/1943 |
| GB | 558584 | 1/1944 |
| GB | 564447 | 9/1944 |
| GB | 1086311 | 10/1967 |
| GB | 1125825 | 9/1968 |
| GB | 1174902 | 12/1969 |
| GB | 1269357 | 4/1972 |
| GB | 1512084 | 5/1978 |
| GB | 2021186 | 11/1979 |
| GB | 2041384 | 9/1980 |

| | | | | | | |
|---|---|---|---|---|---|---|
| GB | 1577648 | 10/1980 | | JP | 09-193120 | 7/1997 |
| GB | 2064989 | 6/1981 | | JP | 2714135 | 10/1997 |
| GB | 2067622 | 7/1981 | | JP | 09-296560 | 11/1997 |
| GB | 2075079 | 11/1981 | | JP | 10025841 | 1/1998 |
| GB | 2078611 | 1/1982 | | JP | 10-044329 | 2/1998 |
| GB | 2080851 | 2/1982 | | JP | 10046741 | 2/1998 |
| GB | 2083512 | 3/1982 | | JP | 10-121693 | 5/1998 |
| GB | 2148871 | 6/1985 | | JP | 10-168199 | 6/1998 |
| GB | 2199857 | 7/1988 | | JP | 10-245925 | 9/1998 |
| GB | 2252987 | 8/1992 | | JP | 10299218 | 11/1998 |
| GB | 2340071 | 2/2000 | | JP | 11050591 | 2/1999 |
| JP | 49-116445 | 2/1973 | | JP | 11050591 A | 2/1999 |
| JP | 49-46761 | 12/1974 | | JP | 11-210203 | 8/1999 |
| JP | 51-23229 | 6/1976 | | JP | 11-217918 | 8/1999 |
| JP | 52051719 | 4/1977 | | JP | 11-511110 | 9/1999 |
| JP | 52052429 | 4/1977 | | JP | 11241448 | 9/1999 |
| JP | 53050229 | 5/1978 | | JP | 11247307 | 9/1999 |
| JP | 54123129 | 9/1979 | | JP | 11256683 | 9/1999 |
| JP | 56-130832 | 3/1980 | | JP | 11-280172 | 10/1999 |
| JP | 55-116684 | 9/1980 | | JP | 2000-008581 | 1/2000 |
| JP | 56048413 | 5/1981 | | JP | 2000-043196 | 2/2000 |
| JP | 57058615 A | 4/1982 | | JP | 2000064554 | 2/2000 |
| JP | 57-156541 | 9/1982 | | JP | 2000-110272 | 4/2000 |
| JP | 5641881 | 9/1982 | | JP | 2000154612 | 6/2000 |
| JP | 58045008 | 3/1983 | | JP | 2000179104 | 6/2000 |
| JP | 58059803 | 4/1983 | | JP | 2000-290630 | 10/2000 |
| JP | 60-242242 | 2/1985 | | JP | 2000-302522 | 10/2000 |
| JP | 58-202823 | 7/1985 | | JP | 2001336230 | 12/2001 |
| JP | 60-105715 | 7/1985 | | JP | 2002047750 | 2/2002 |
| JP | 61137634 | 6/1986 | | JP | 2002097732 | 4/2002 |
| JP | 61-68967 | 9/1986 | | JP | 2002161623 | 6/2002 |
| JP | 037444/1987 | 2/1987 | | JP | 2002354091 | 12/2002 |
| JP | 63117939 | 5/1988 | | JP | 2002364091 | 12/2002 |
| JP | 63-31426 | 6/1988 | | JP | 2004027497 | 1/2004 |
| JP | 63-19636 | 9/1988 | | KR | 1992-8773 | 10/1992 |
| JP | 63257631 | 10/1988 | | KR | 1994-0006957 | 4/1994 |
| JP | 63-47229 | 12/1988 | | KR | 1019967005677 | 11/1996 |
| JP | 64-20910 | 1/1989 | | KR | 200158855 | 5/1998 |
| JP | 64-22385 | 1/1989 | | KR | 100231910 | 9/1999 |
| JP | 64-25200 | 1/1989 | | KR | 200172372 | 12/1999 |
| JP | 64-50541 | 3/1989 | | KR | 100274218 | 9/2000 |
| JP | 01128748 | 5/1989 | | MY | 107883 | 6/1996 |
| JP | 1178658 | 7/1989 | | NO | 9901129 | 9/2000 |
| JP | 02192447 | 7/1990 | | NZ | 19354 | 9/1984 |
| JP | 2204566 | 8/1990 | | NZ | 210395 | 11/1984 |
| JP | 02-236350 | 9/1990 | | NZ | 211265 | 2/1985 |
| JP | 3-4654 | 2/1991 | | NZ | 20119 | 10/1985 |
| JP | 03-128912 | 5/1991 | | NZ | 20120 | 10/1985 |
| JP | 3-63641 | 6/1991 | | NZ | 20844 | 11/1986 |
| JP | 3-66338 | 6/1991 | | NZ | 218315 | 2/1987 |
| JP | 04089340 | 3/1992 | | NZ | 21875 | 4/1988 |
| JP | 4149352 | 5/1992 | | NZ | 22705 | 7/1989 |
| JP | 04295072 | 10/1992 | | NZ | 240533 | 11/1991 |
| JP | 04300232 | 10/1992 | | NZ | 221389 | 12/1991 |
| JP | 5-1532 | 1/1993 | | NZ | 242960 | 5/1992 |
| JP | 044323 | 2/1993 | | NZ | 25267 | 6/1993 |
| JP | 058215/1991 | 2/1993 | | NZ | 248942 | 10/1993 |
| JP | 05040473 A | 2/1993 | | NZ | 230209 | 12/1993 |
| JP | 05-057786 | 3/1993 | | NZ | 247463 | 12/1993 |
| JP | 0524768 | 3/1993 | | NZ | 25838 | 4/1994 |
| JP | 565760 | 3/1993 | | NZ | 26065 | 7/1994 |
| JP | 5-42192 | 10/1993 | | NZ | 26066 | 7/1994 |
| JP | 06-017621 | 1/1994 | | NZ | 306382 | 5/1996 |
| JP | 6023889 | 2/1994 | | NZ | 240533 | 7/1996 |
| JP | 6-28563 | 3/1994 | | NZ | 270310 | 12/1996 |
| JP | 06-080264 | 3/1994 | | NZ | 280409 | 6/1997 |
| JP | 06123158 | 5/1994 | | NZ | 280235 | 9/1997 |
| JP | 06278116 | 10/1994 | | NZ | 259493 | 10/1997 |
| JP | 7232975 | 9/1995 | | NZ | 242960 | 12/1997 |
| JP | 08012450 | 1/1996 | | NZ | 314544 | 6/1998 |
| JP | 08068184 | 3/1996 | | NZ | 504881 | 10/1998 |
| JP | 08074377 | 3/1996 | | NZ | 334918 | 3/1999 |
| JP | 2507028 | 5/1996 | | NZ | 336159 | 6/1999 |
| JP | 08151246 A | 6/1996 | | NZ | 331336 | 10/1999 |
| JP | 08175859 | 7/1996 | | NZ | 512028 | 11/1999 |
| JP | 08217561 | 8/1996 | | NZ | 502004 | 12/1999 |
| JP | 2538120 | 3/1997 | | NZ | 331553 | 1/2000 |
| JP | 09-123340 | 5/1997 | | NZ | 334899 | 4/2000 |
| JP | 09-123692 | 5/1997 | | NZ | 400643 | 4/2000 |

| | | |
|---|---|---|
| NZ | 505799 | 7/2000 |
| NZ | 507846 | 10/2000 |
| NZ | 508055 | 11/2000 |
| NZ | 335529 | 12/2000 |
| NZ | 502017 | 12/2000 |
| NZ | 500215 | 5/2001 |
| NZ | 516912 | 1/2002 |
| NZ | 517658 | 3/2002 |
| NZ | 524520 | 9/2003 |
| NZ | 518988 | 10/2003 |
| NZ | 520286 | 3/2004 |
| NZ | 521491 | 6/2004 |
| NZ | 525507 | 9/2004 |
| NZ | 525328 | 2/2005 |
| NZ | 528304 | 4/2005 |
| NZ | 530605 | 6/2005 |
| NZ | 532182 | 12/2005 |
| NZ | 536129 | 2/2006 |
| PL | 106840 | 1/1999 |
| PL | P-339671 | 1/2001 |
| SG | 93908341 | 4/1989 |
| SG | 92906122 | 8/1989 |
| SG | 97920847 | 11/1990 |
| SG | 97912869 | 4/1993 |
| SG | 95012084 | 1/1994 |
| SG | 96026257 | 4/1994 |
| SG | 96120035 | 4/1995 |
| SG | 97059547 | 5/1996 |
| SG | 98021017 | 9/1996 |
| SG | 98021751 | 9/1996 |
| SG | 98051485 | 2/1997 |
| SG | 97018402 | 5/1997 |
| SG | 98012917 | 6/1997 |
| SG | 99017030 | 10/1997 |
| SG | 99235 | 2/2007 |
| SU | 587123 | 1/1978 |
| SU | 607813 | 5/1978 |
| SU | 655678 | 4/1979 |
| SU | 1114646 | 9/1984 |
| SU | 1606633 | 11/1990 |
| TW | 282800 | 9/1986 |
| TW | 278536 | 6/1996 |
| TW | 278537 | 6/1996 |
| TW | 150027 | 2/2001 |
| TW | 255851 | 6/2006 |
| WO | WO 81/02758 | 10/1981 |
| WO | WO 85/03966 | 9/1985 |
| WO | WO 90/08245 | 7/1990 |
| WO | WO 91/11321 | 8/1991 |
| WO | WO 91/14057 | 9/1991 |
| WO | WO 9114058 | 9/1991 |
| WO | WO 92/00927 | 1/1992 |
| WO | WO 92/17657 | 10/1992 |
| WO | WO 93/06316 | 4/1993 |
| WO | WO 93/12303 | 6/1993 |
| WO | WO 93/21126 | 10/1993 |
| WO | WO 93/24711 | 12/1993 |
| WO | WO 94/19561 | 9/1994 |
| WO | WO 95/11357 A1 | 4/1995 |
| WO | WO 95/26450 | 10/1995 |
| WO | WO 96/14482 | 5/1996 |
| WO | WO 97/07968 | 3/1997 |
| WO | WO 97/08111 | 3/1997 |
| WO | WO 97/08401 | 3/1997 |
| WO | WO 97/19810 A1 | 6/1997 |
| WO | WO 97/23696 | 7/1997 |
| WO | WO 97/28342 | 8/1997 |
| WO | WO 98/10151 | 3/1998 |
| WO | WO 98/16697 | 4/1998 |
| WO | WO 98/32713 | 7/1998 |
| WO | WO 98/45222 | 10/1998 |
| WO | WO 99/10607 | 3/1999 |
| WO | WO 99/13185 | 3/1999 |
| WO | WO 99/22095 | 5/1999 |
| WO | WO 99/31158 | 6/1999 |
| WO | WO 99/43904 | 9/1999 |
| WO | WO 99/64692 | 12/1999 |
| WO | WO 00/08271 | 2/2000 |
| WO | WO 00/14354 | 3/2000 |
| WO | WO 00/21901 | 4/2000 |
| WO | WO 00/22032 | 4/2000 |
| WO | WO 00/55446 | 9/2000 |
| WO | WO 00/63506 | 10/2000 |
| WO | WO 00/65166 | 11/2000 |
| WO | WO 01/14277 A2 | 3/2001 |
| WO | WO 01/16048 | 3/2001 |
| WO | WO 01/25561 | 4/2001 |
| WO | WO 01/25562 | 4/2001 |
| WO | WO 01/26894 | 4/2001 |
| WO | WO 01/36191 | 5/2001 |
| WO | WO 01/49952 | 7/2001 |
| WO | WO 01/59228 | 8/2001 |
| WO | WO 01/65021 | 9/2001 |
| WO | WO 01/66485 | 9/2001 |
| WO | WO 01/68547 | 9/2001 |
| WO | WO 01/73239 | 10/2001 |
| WO | WO 02/09663 | 2/2002 |
| WO | WO 02/27109 | 4/2002 |
| WO | WO 02/28795 | 4/2002 |
| WO | WO 02/28796 | 4/2002 |
| WO | WO 02/31287 | 4/2002 |
| WO | WO 02/32830 | 4/2002 |
| WO | WO 02/36524 | 5/2002 |
| WO | WO 02/38518 | 5/2002 |
| WO | WO-0234508 | 5/2002 |
| WO | WO 02/055806 | 7/2002 |
| WO | WO 02/081839 | 10/2002 |
| WO | WO 02/081840 | 10/2002 |
| WO | WO 02/081841 | 10/2002 |
| WO | WO 02/081842 | 10/2002 |
| WO | WO 02/096824 | 12/2002 |
| WO | WO 03/106365 | 12/2003 |
| WO | WO 2004/031093 | 4/2004 |
| WO | WO 2004/063113 | 7/2004 |
| WO | WO 2005/003478 | 1/2005 |
| WO | WO 2005/019550 | 3/2005 |
| WO | WO 2005/035900 | 4/2005 |
| WO | WO 2005/052276 | 6/2005 |
| WO | WO 2005/068741 | 7/2005 |
| WO | WO 2005/078210 | 8/2005 |
| WO | WO 2006/039762 | 4/2006 |

OTHER PUBLICATIONS

PCT Rule 66 Written Opinion for International Application No. PCT/US03/22656, filed Aug. 16, 2003.

"Hardiglaze® wet area linings" Product brochure, Published May 1999, see p. 18.

U.S. Appl. No. 10/055,214, filed Oct. 24, 2001, entitled Adhesive Mixture for Bonding Fluorohydrocarbon Film to Fibrous Cementitious Materials; inventors Weiling Peng and Jeffrey Bergh; (Abandoned).

Australian—International Search Report for AU 2004903567 filed Jun. 29, 2004.

International Search Report dated Feb. 11, 2005 for PCT/AU2004/001672.

First Examination Report dated Feb. 15, 2005; AU Innovation Patent No. 2004101018.

Australian Patent and Design Infringement Search Results in Respect of the Pre-finished Eave System Concept.

New Zealand Patent and Design Infringement Search Results in Respect of the Pre-Finished Eave System Concept.

PCT International Preliminary Examination Report for International Application No. PCT/US03/22656 dated Aug. 23, 2004.

Dupont TEDLAR polyvinyl fluoride film (Adhesive and Lamination Guide for Tedlar PVF Film)—10 pgs.

Dupont TEDLAR polyvinyl fluoride film (Adhesive and Lamination Guide for Tedlar PVF Film)—1 pg.

Zdenek Sauman et al; II Cemento, vol. 3, 1978, pp. 343-350 "influence Explanation of Siliceous Materials Additive to Cement as well as of Pastes Hydration and Their Treatment Temperature on the Lime Quantity Liberated by Rehydration".

Ray A, et al., Thermochimica Acta 250 (1995) pp. 189-195 "Use of DTA to determine the Effect of Mineralizers on the Cement-Quartz Hydrothermal Reactions."

de Silva P.S. et al. Adv. In Cem. Res. (1990), vol. 3, No. 12, October, pp. 167-177, "Hydration of Cements Based on Metakaolin: Thermochemistry".
Ambriose J. et al; Int. Congress GRC/87, 6th Biennial Congress of the GRCA, Oct. 20-23, 1987 Edinburgh, Scotland, pp. 19-24, "Metakaoline Blended Cements: An Efficient Way to Improve GRC Durability and Ductility".
Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.
Letter from Sargent & Krahn dated Jan. 31, 2005 reporting First Substantive Report for Chilean Patent Application No. 655-2002 dated Mar. 4, 2002, which claims priority to U.S. Appl. No. 60/281,195, filed Apr. 3, 2001.
Letter from Sargent & Krahn dated Apr. 1, 2005 reporting First Substantive Report for Chilean Patent Application No. 653-2002 dated Mar. 4, 2002, which claims priority to U.S. Appl. No. 60/281,195, filed Apr. 3, 2001.
CSR RendaLine—External Wall Cladding System—Brochure, Jan. 2002.
EPS Plaster Cladding Systems Technical and Installation Manual, Rockcote Architectural Coatings (NZ) Limited, Mar. 2003.
STOANZ Trade literature, Nov. 2003.
STOANZ Trade literature, Jan. to May 2004.
PBS Distributors Ltd trade literature relating to Vent-Clad cladding system, Aug. 2003.
Plaster Systems, Ltd., "Insulclad cavity based exterior plaster cladding system specification," Feb. 2004.
Plaster Systems, Ltd., "Insulclad cavity based exterior plaster cladding system specification," Oct. 2003.
Department of Building and Housing, "Compliance Document for NZ Bldg Code Clause E2," 2005.
James Hardie article, "External Wall Cladding," Oct. 1990 (2 pgs).
James Hardie article, "Primeline Weatherboards," Oct. 1996 (8 pgs).
HARDIHOME Lap Siding with the Embossed EZ Line Alignment Aid, Mar. 2000.
Kuroki et al., "Cement-Bonded Board Industry and Market in Japan and New Technology Developments," 1995.
BGC Fibre Cement "Ceramic Tile Floor Underlay" Apr. 2002, (7 pgs.).
Gypsum Association Manual, 14th Edition 1994, p. 33-34.
J.E. Mark, Applied Polymer Science 21st Century, pp. 209-222 (Clara D. Craver and Charles E. Carraher, Jr. ed., Elsevier 2000).
Hawley's Condensed Chemical Dictionary, Fourteenth Edition, Revised by Richard J. Lewis, Sr., published by John Wiley & Sons, Inc. pp. 447, 624, 903-904 (date unknown).
Database WPI, Section Ch, Week 1977, 23, Derwent Publications Ltd., London, GB, XP002159268.
Database WPI, Section Ch, Week 1977, 23, Derwent Publications Ltd., London, GB, XP002159269.
PCA (Portland Cement Assoc) article: "Concrete Homes—Fiber Cement Siding" (3 pgs).
New Zealand Department of Building and Housing, "Non-flush finished joints," Jul. 1, 2005, Acceptable Solution E2/AS1 (extract from the New Zealand Building Code) 1 pg).
Notification of First Office Action for Chinese Patent Application No. 00815911.4 dated Sep. 24, 2004.
Notification of First Office Action for Chinese Patent Application No. 02811074.9 dated Feb. 4, 2005.
Notification of First Office Action for Chinese Patent Application No. 02811237.7 dated Mar. 18, 2005.
Notification of First Office Action for Chinese Patent Application No. 02811168.0 dated Mar. 18, 2005.
Chilean patent application 170-97 (S. Ind. Pizarreno, Dec. 5, 1997).
Chilean patent application 2673-97 (S. Ind. Pizarreno, Jan. 30, 1997).
Letter from Sargent & Krahn dated Apr. 11, 2005 reporting First Substantive Report for Chilean Patent Application No. 656-2002 dated Mar. 4, 2002, which claims priority to U.S. Appl. No. 60/281,195, filed Apr. 3, 2001.
Written Opinion of the International Searching Authority for PCT/US2004/019980 dated Dec. 20, 2005.
International Preliminary Examination Report for PCT/US00/27451 dated Dec. 7, 2001.
International Search Report for PCT/US00/27451 dated Feb. 2, 2001.
International Preliminary Examination Report for Application PCT/US00/31729 dated Feb. 21, 2002.
International Search Report for PCT/US00/31729 dated Feb. 21, 2001.
International Search Report for PCT/AU00/00320 dated May 31, 2000.
International Search Report for PCT/US 02/10760 dated Aug. 5, 2002.
International Preliminary Examination Report for Application PCT/US02/10760 dated Feb. 3, 2003.
International Search Report for PCT/US 02/10610 dated Aug. 5, 2002.
International Preliminary Examination Report for Application PCTS/US02/10610 dated Feb. 7, 2003.
International Search Report for PCT/US 02/10608 dated Aug. 5, 2002.
International Preliminary Examination Report for Application PCT/US02/10608 dated Feb. 14, 2003.
International Search Report for Application PCT/US02/10609 dated Aug. 1, 2002.
International Search Report for PCT/US 02-10609 dated Aug. 7, 2002.
International Preliminary Examination Report for Application PCT/US02/10609 dated Apr. 22, 2003.
International Search Report for PCT/US2004/019980 dated Sep. 15, 2004.
International Preliminary Examination Report for Application PCT/US04/19980 dated Jul. 27, 2005.
International Preliminary Examination Report for Application PCT/US01/10908 dated Apr. 6, 2002.
International Search Report for PCT/US01/01908 dated Mar. 19, 2001.
International Search Report for PCT/AU97/00692 dated Dec. 3, 1997.
Examination Report for European Patent Application No. 00980518.5 dated Jan. 5, 2005).
Notice of Opposition of Chilean patent application No. 653-2002.
Notice of Opposition of Chilean patent application No. 655-2002.
Notice of Opposition of Chilean patent application No. 656-2002.
Notice of Opposition of Chilean patent application No. 654-2002.
Translation of Taiwanese Patent Office Decision of Appeal and Opposition (App.#85114421).
Supplemental European Search Report (EP 97943673) dated Mar. 27, 2001.
International Search Report for AU 2004903567, filed Jun. 29, 2004.
International Search Report for PCT/IB2005/050709 dated May 23, 2005.
International Preliminary Report for PCT/IB2005/050709 dated Dec. 22, 2005.
Applications from CHP family chart.
Office Action mailed Jul. 13, 2007 in U.S. Appl. No. 10/117,401.
Office Action mailed Dec. 12, 2006 in U.S. Appl. No. 10/117,401.
Office Action mailed Mar. 27, 2006 in U.S. Appl. No. 10/117,401.
Office Action mailed Oct. 5, 2005 in U.S. Appl. No. 10/117,401.
Office Action mailed Mar. 14, 2005 in U.S. Appl. No. 10/117,401.
Office Action mailed Aug. 25, 2004 in U.S. Appl. No. 10/117,401.
Office Action mailed Nov. 3, 2003 in U.S. Appl. No. 10/117,401.
Two EPO Examination Reports in copending Application No. 02-719-436.6.
Decision to Grant a Patent and an Examination Report for copending Japanese Application No. 2002-579593.
Examiner's First Report for Copending Australian Patent Application No. 2002250516 dated Dec. 14, 2006.
Examination Reports in Copending Chilean Application No. 656-02 (dated 2005 and 2006).
Notice of Registration and two Office Actions in copending China Application No. 02811237.7.
Decision to Grant for Patent and Preliminary Notice of Objection in copending Korean Application No. 10-2003-7013036.
Letters Patent for Copending New Zealand Patent No. 528779.
Certificate of Grant of Patent in Copending Singapore Patent Application No. 200305728-8.

Draft for Consultation: Cost benefit analysis. Proposed changes to Clause E2 of the New Zealand Building Code and Approved Documents B2/AS1, E2/AS1 & E2/VM1 Jun. 13, 2003.
Copyright Registration VAu644-168, Registration Date Feb. 7, 2005.
Copyright Registration VAu644-167, Registration Date Feb. 7, 2005.
Copyright Registration VAu644-166, Registration Date Feb. 7, 2005.
Copyright Registration VAu644-165, Registration Date Feb. 7, 2005.
Supplemental Copyright Registration VAu740-145, Registration Date Mar. 16, 2006.
Copyright Registration VAu644-161, Registration Date Feb. 7, 2005.
Copyright Registration VAu644-162, Registration Date Feb. 7, 2005.
Supplemental Copyright Registration VAu740-144, Registration Date Mar. 16, 2006.
Derwent Acc No. 1981-00856D for FR 2451428, published Nov. 14, 1980.
Machine translation for FR 2451428.
Machine translation for JP 2714135.
Translation of application JP 48-15522 for publication JP 49-116445.
Translation of application JP 55-27157 for publication JP 56-130812.
Derwent Acc No. 1991-295696 for WO 91/14058 published Sep. 19, 1991.
Machine translation for KR 1994-0006957.
Third Party Observations filed by Redco for corresponding European patent application EP03764818.5 on Dec. 7, 2006.
EPO Communication pursuant to Art 115(2) EPC d ated Dec. 19, 2006 advising applicant of the third party observations filed by Redco.
Redco Third Party Observations: 1: MIRRAL Technical Data Sheets (Enclosures 1-7); Jun. 1993.
Redco Third Party Observations: 4: NOVACEL Brochures (Enclosures 8-10); Oct. 1997.

* cited by examiner

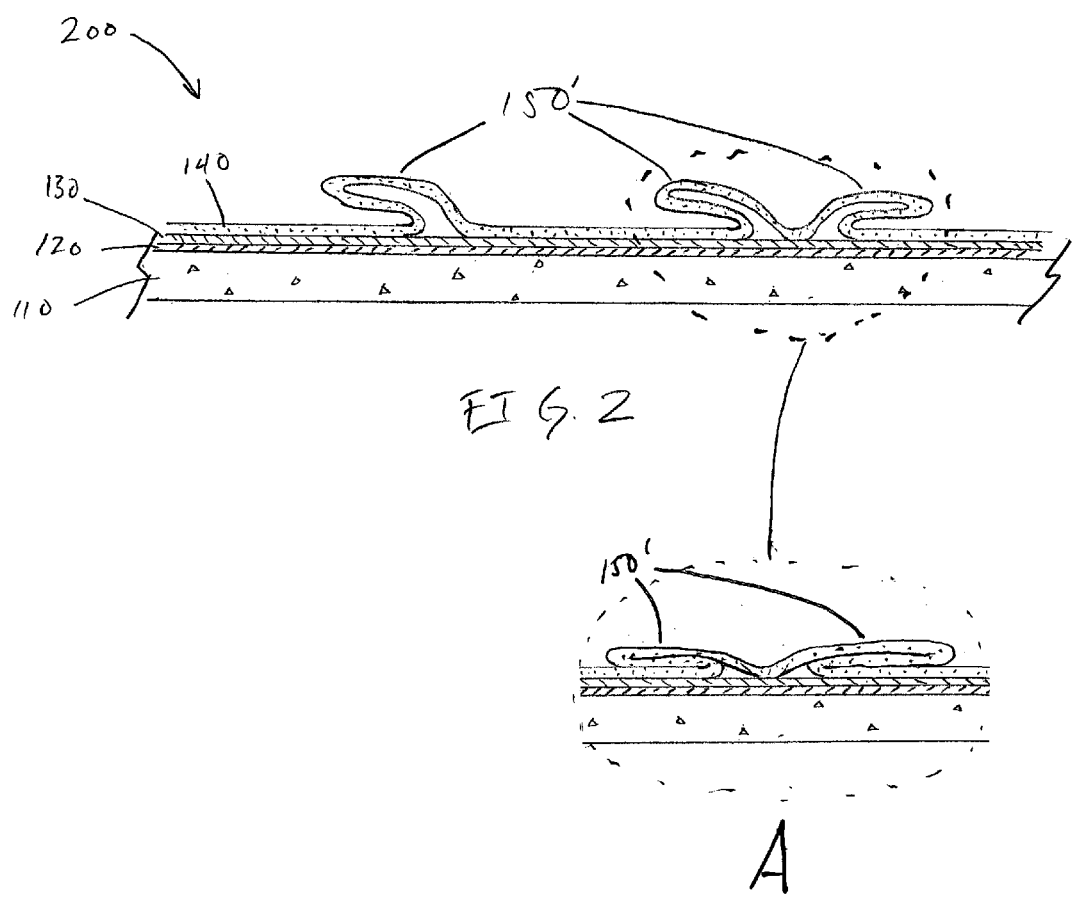

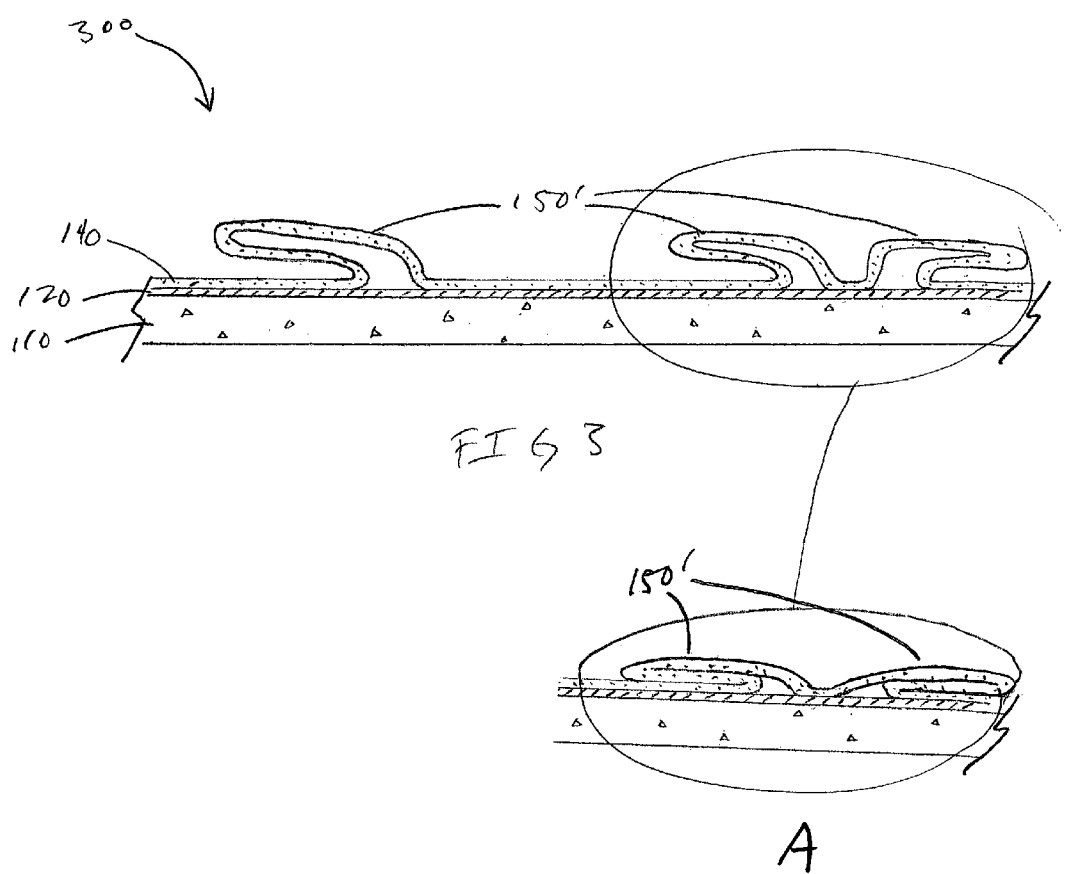

PACKAGING PREFINISHED FIBER CEMENT PRODUCTS

RELATED APPLICATIONS

The present application claims the benefit of U.S. Provisional Application No. 60/396,303, filed Jul. 16, 2002, the disclosure of which is incorporated by reference.

BACKGROUND OF THE INVENTION

1. Field of the Invention

The present application is generally directed to building materials, and more specifically, to the packaging of prefinished fiber cement products.

2. Description of the Related Art

In the construction industry, building materials are often prefinished with a coating or laminate prior to sale and installation. For example, prefinished siding planks and panels are popular because of the labor and time saved during installation; a siding contractor need only install the material on the exterior of a building, and no subsequent finishing is required. Producing prefinished products can be a boon for manufacturers as well. By finishing building materials before they leave the factory, a manufacturer has complete control over the quality and consistency of the finished product, which ensures that an adequate coating thickness is applied and that the coating will have a predictable service lifetime. Economies typically permit a manufacturer to coat or laminate materials at a lower cost than an end user of the material. Thus, prefinished siding is popular with builders because they can charge a premium for finished siding without incurring the cost of finishing it themselves.

Traditionally, unfinished siding planks and panels are stacked one atop another on a wood pallet, secured to the pallet with metal or plastic bands and wrapped with plastic or placed in bags to protect the siding from damage and the elements during transport, handling, and storage. Prefinished siding planks require additional packaging and protection to maintain the integrity and appearance of the factory-applied coating. In packaging prefinished siding composites such as hardboard or OSB siding, a protective layer of plastic film, foam, or paper between two siding planks or panels has been used to protect the prefinished surface. These protective layers are generally applied without an adhesive. Automated application is less accurate absent an adhesive to anchor the protective layer to the product. Consequently, such protective layers are typically applied manually, which is expensive and limits throughput. Packaging prefinished planks and panels made from fiber cement presents a special problem because the abrasive nature of fiber cement may damage the protective layer during storage, transport, and handling of the fiber cement products.

In a typical manufacturing operation for fiber cement siding planks, several planks are cut from a single sheet. These planks are then finished and packaged separately such that the finished planks are individually placed back-to-back and front-to-front with a protective layer sandwiched either between each plank, or sometimes between those planks stacked front-to-front to protect the prefinished surface. Stacking in this configuration prevents the abrasive backside of the plank or panel from contacting the prefinished front. Stacking planks back-to-back and front-to-front requires a means to flip the planks in the stacking operation, either manually or mechanically, thereby requiring additional labor or a piece of equipment built for this purpose, which adds additional equipment capital, operating, and maintenance costs.

In addition to protecting the prefinished faces of the fiber cement articles, the protective layers, also known as slip sheets, help to keep the finished surfaces clean. The protective layers also protect the finished surfaces from moisture and inhibit efflorescence.

In some cases, the protective layers themselves damage the finished surfaces, for example, changing the glossiness of the finish (e.g., burnishing), changing the color of the finish, or removing portions of the finish when the protective layer is removed from the finished surface. A protective layer may also trap undesired moisture against the finished surface.

SUMMARY OF THE INVENTION

Disclosed herein, in one embodiment, is a protected prefinished fiber cement product with a protective layer that protects the finish from damage in storage, transport, and handling. When removed, the protective layer does not leave an adhesive residue on the finish, and also resists tearing. The protected prefinished fiber cement products are conveniently stacked on pallets for storage and transport. Also disclosed is a method for manufacturing protected prefinished fiber cement products. Disclosed is a protective layer with spacers bonded thereto and a method for manufacturing the same.

One embodiment of the disclosed invention provides a protected prefinished fiber cement product comprising a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal.

Another embodiment provides an assembly of protected prefinished fiber cement products comprising a plurality of protected prefinished fiber cement articles arranged in a stack. A protected prefinished fiber cement product comprises a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal.

Another embodiment provides a method of constructing a building using a protected prefinished fiber cement product. A protected prefinished fiber cement product comprises a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal. The protective layer is removed and the fiber cement product fastened to a building frame.

Another embodiment provides a method of manufacturing a protected prefinished fiber cement product. A protected prefinished fiber cement product comprises a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal. The method comprises adhering the protective layer to the finish layer of the prefinished fiber cement product.

Another embodiment provides a protective layer with a spacer bonded thereto used for manufacturing a protected prefinished fiber cement product. A protected prefinished fiber cement product comprises a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal. The protective layer with a spacer bonded thereto comprises a protective layer and a spacer bonded to a face of the protective layer.

Another embodiment provides a method) of manufacturing a protective layer with a spacer bonded thereto used for manufacturing a protected prefinished fiber cement product. A protected prefinished fiber cement product comprises a fiber cement product, a finish layer applied to the fiber cement product, and a protective layer adhered to the finish layer. The protective layer protects the finish layer from damage in storage, transport, and handling. Removing the protective layer leaves no residue on the finish layer and does not damage the finish layer, and the protective layer resists tearing on removal. The method comprises bonding a spacer to a face of a protective layer.

BRIEF DESCRIPTION OF THE DRAWINGS

FIG. 2 illustrates in cross-section an embodiment of the disclosed protected prefinished fiber cement product with an adhesively attached protective layer and folded spacers.

FIG. 3 illustrates in cross-section of an embodiment of the disclosed protected prefinished fiber cement product with an electrostatically attached protective layer and folded spacers.

DETAILED DESCRIPTION OF THE PREFERRED EMBODIMENTS

Figure 1A:
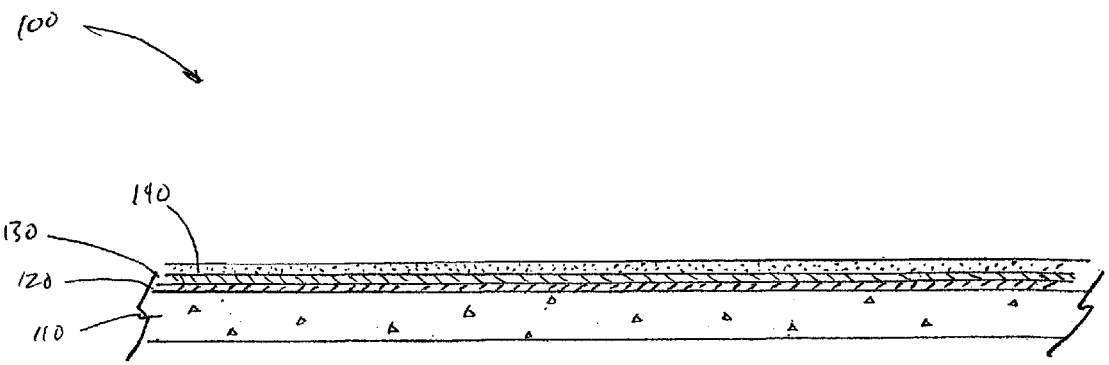
FIG. 1A and FIG. 1B illustrate in cross-section an embodiment of the disclosed protected prefinished fiber cement product with an adhesively attached protective layer and spacers.

Described herein, in one embodiment, is a packaging system used to protect the finish of a prefinished fiber cement article or product from damage in handling, transport, or storage. A method of preparing the packaging system and applying the packaging system to a finished fiber cement article is also described. The term "damage" is used herein in its ordinary meaning, and also with a particular meaning of undesirable changes to the finish, including, for example, changes in the glossiness (e.g., burnishing); changes in the color; removal of a part of the finish (e.g., chips, dents, scratches, and the like); efflorescence; and residue from the packaging system (e.g., adhesive residue).

The disclosed system and method may be used to package prefinished products made from any suitable material or materials, for example, wood, wood composites, cement, concrete, metals, rubber, rubber composites, polymer resins, and polymer composites. In one embodiment, the material or substrate is fiber cement. The term "fiber cement" is used herein in its ordinary meaning, as well as for a material made from fibers, silica, and cement. In one embodiment, the fibers are cellulose fibers, derived, for example, from the pulping of wood. The cement is typically Portland cement. Fiber cement may also include other components, for example, density modifiers, additives, aggregate, and water repellants. The fiber cement articles are typically building products, and include, for example, panels, planks, shingles, soffits, facia, trim pieces, moldings, doors, columns, pilasters, and the like. The fiber cement products may be smooth, textured, or perforated.

The protective layer or sheet is selected to protect the finished surfaces of a fiber cement product during handling, transport, and storage. The protective layer may be made from any material that will provide adequate protection, including, paper, polymer resin, polymer foam, and combinations thereof. A preferred material for the protective layer is a polymer film.

The fiber cement product may be finished with any suitable finish. Suitable finishes are well known in the art, for example, water-based paint, solvent-based paint, oil-based paint, or solventless or low-solvent paint; latex-, alkyd-, epoxy-, urethane-, enamel-, or acrylic-based finishes; or powder coats. The finish may be cured at ambient temperature or at an elevated temperature. In other embodiments, the finish is UV-cured or photo-cured. In another embodiment, the finish is laminated to the fiber cement substrate using methods known in the art, for example, thermally or with an adhesive.

The finish may be applied in a single layer or coat, or in multiple coats. In multiple coat finishes, each coat may be selected to provide particular performance characteristics. In one embodiment, a primer layer is applied to the fiber cement article, and one or more decorative coats are applied over the primer. The primer typically provides improved adhesion for later-applied finish layers, and may also have additional properties, for example, water repellency or fungicidal activity.

In one embodiment, the topmost coat is pigmented and has a selected surface glossiness. The particular topmost coat may also be selected for other desirable properties, for example, durability, fade resistance, ease of cleaning, or water management.

In another embodiment, the topmost coat is a transparent or translucent coat, which may be a protective coat, and/or provide additional benefits, for example, UV resistance, durability, water resistance, or a desired surface glossiness.

In another embodiment, the finish is a primer coat, which is finished as desired in the field.

The protected fiber cement products are conveniently stacked for storage and transport. In one embodiment, the protected fiber cement products are stacked on a pallet. The protected fiber cement products may be stacked face-to-back without damaging the finished surfaces. In another embodiment, the protected fiber cement products are stacked face-to-face and/or back-to-back.

The protective layer also protects the finish layer from damage during handling, for example, at a construction site. In the construction of a building, the protected fiber cement product is fastened to a building frame. In one embodiment, the protective layer is removed before fastening the protected fiber cement product to the frame. In another embodiment, the protective layer is removed after fastening the protected fiber cement product to the frame. For example, the protected fiber cement plank may be partially fastened to the frame using two nails partially driven through the plank. The protective layer would then be removed and the nails driven to their final positions. Additional nails may then be used to fully secure the plank.

FIG. 1A illustrates a protected fiber cement product 100 according to an embodiment of the present disclosure comprising a fiber cement product 110, a finish layer 120, an optional layer of adhesive 130, and a protective layer 140.

The finished fiber cement product is prepared by coating or laminating the top surface of the fiber cement product 110 with a finish 120, which comprises one or more coatings or laminates. The materials used and methods of applying coatings and laminates are all well known in the art, as described above.

Optionally, an adhesive layer 130 is applied to the finish 120 on the fiber cement product 110. In another embodiment, an adhesive layer 130 is optionally applied to one surface of the protective layer 140. In either case, the adhesive layer 130 adhesively secures the protective layer 130 to the finish 120. The adhesive properties of the optional adhesive layer 130 preferably provide a weak bond to the finish 120 so that the polymer film 140 is easily removed without leaving an adhesive residue on the finish 120, and without removing or otherwise damaging the finish 120. Moreover, in one embodiment, the release properties of the adhesive in concert with the tensile strength of the protective layer allow the protective layer to be removed from the protected fiber cement product without tearing or with minimal tearing.

Materials suitable for the protective layer 140 include a polymer film; a paper sheet, optionally coated on at least one face with a polymer film; or a sheet of polymer foam, optionally coated on at least one face with a polymer film. In certain embodiments, the protective layer is a woven or nonwoven polymer fabric. In one embodiment, the thickness of the protective layer is from about 0.0001 inch to about 0.08 inch (about 0.003-2 mm). In another embodiment, the thickness of the protective layer is from about 0.0003 inch to about 0.03 inch (about 0.008-0.8 mm). In another embodiment, the thickness of the protective layer is from about 0.001 inch to about 0.01 inch (about 0.03-0.3 mm). In one embodiment, the ultimate tensile strength of the protective layer is from about 500 to about 60,000 psi. In another embodiment, the ultimate tensile strength of the protective layer is from about 1000 to about 5000 psi. As discussed above, in one embodiment, the protective layer resists tearing on removal from the protected prefinished fiber cement product.

In certain embodiments, the protective layer 140 is a monolayer film or a multilayer film. A monolayer film is a protective layer 140 in which a polymer resin is blended with an adhesive. In embodiments using monolayer films, the adhesive layer 130 is integrated into the protective layer 140. Suitable polymer resins from which a polymer film may be manufactured are known in the art, for example, polyethylene, polypropylene, polyvinyl chloride, polyvinylidene chloride, polyester, polyamide, silicone, and blends or copolymers thereof. Polyethylene may be of any suitable type, for example, low density, linear low density, high density, or metallocene. Suitable adhesives include ethylene-acrylic acid, ethylene-vinyl acetate, or mixtures thereof. Methods for blending polymer resins and adhesives are well known in the art using equipment such as high-shear mixers, or single or twin screw extruders. The blended polymer resin and adhesive are then formed into a film by methods known in the art, for example, extrusion, blowing, and casting.

A multilayer film is a protective layer 140 to which an adhesive layer 130 is applied to at least one face. The adhesive may be applied to a polymer film; to a paper sheet, which may optionally comprise a polymer film on the adhesive-coated face; or to a foam sheet, which may optionally comprise a polymer film on the adhesive-coated face. In a preferred embodiment, the protective layer is a polymer film. Any suitable polymer resin known for forming a polymer film may be used for the polymer film, including, for example, polyethylene, polypropylene, polyvinyl chloride, polyvinylidene chloride, polyester, polyamide, silicone or blends or copolymers thereof. Polyethylene may be of any suitable type, for example, low density, linear low density, high density, or metallocene. In one embodiment, the polymer film may be made a blend of two or more polymer resins. In another embodiment, the polymer film comprises layers of polymer resins.

The adhesive layer 130 may be applied to the protective layer 140 using equipment and methods well-known in the art, for example by solvent coating, extrusion, hot-melt coating, calendaring, curtain coating, gravure or pattern coating, spray coating, lamination, pressure-feed die coating, knife coating, roller coating, or by any other suitable technique.

Preferred adhesive materials for the adhesive component of monolayer films and multilayer films are pressure-sensitive adhesives and hot-melt adhesives that bond weakly to the finish 120 on the fiber cement product 110. Consequently, the protective layer 140 is easily removed from the finish 120 without leaving any adhesive residue, or otherwise adversely affecting the finish 120, for example, by changing the glossiness (e.g., burnishing spots), changing the color, or removing a portion of the finish 120. Examples of such adhesive materials include compositions based on polyacrylate, polyvinyl ether, rubber (e.g., natural rubber), polyisoprene, polychloroprene, butyl rubber, neoprene rubber, ethylene propylene diene rubber (EPDM), polyisobutylene, butadiene-acrylonitrile polymer, thermoplastic elastomers, styrene-butadiene rubber, poly-alpha-olefins, amorphous polyolefins, silicones, ethylene-containing copolymers (e.g., ethylene-acrylic acid, ethylene vinyl acetate, ethylene ethyl acrylate, ethylene n-butyl acrylate, and ethylene methyl acrylate), polyurethanes, polyamides, epoxys, polyvinylpyrrolidone and polyvinylpyrrolidone copolymers, polyesters, and mixtures or copolymers thereof. The adhesive component may also contain modifiers, for example, tackifiers, plasticizers, fillers, antioxidants, stabilizers, pigments, curatives, crosslinkers, solvents, and the like.

Both monolayer films or multilayer films may be separately manufactured and supplied in a form (e.g., rolls) suitable for continuous application to the finished fiber cement products using, for example, pressurized rollers or a laminating press. The pressurized rollers may be used either with or without heating. A monolayer polymer film may also be blended and extruded as a thin film, which is immediately applied to a finished fiber cement product. Similarly, a multilayer film may be contemporaneously co-extruded and applied to a finished fiber cement product.

In another embodiment, an adhesive layer 130 is applied to the finish 120 of a fiber cement product 110, and the protective layer is applied to the adhesive layer 130. Suitable adhesives for the adhesive layer 130 and suitable protective layers 140 are similar to those described above for a multilayer film. The adhesive layer is applied to the fiber cement product by means described above.

The protective layer 140 preferably resists abrasion from adjacent objects, for example, fiber cement products, pallets, and metal or plastic bands, when the fiber cement products are stacked one atop the other on a shipping pallet, and on handling. Consequently, in one embodiment of the disclosed packaging system, the fiber cement products are stacked front-to-back, obviating the need to flip alternate products when stacking. In other embodiments, the fiber cement products are stack front-to-front and back-to-back. Thus a protective layer of predetermined thickness, tensile strength, and impact strength is selected to provide the desired level of durability. The protective layer 140 and adhesive are selected so to not adversely affect the finish 120, for example by changing the glossiness (e.g., burnishing or polishing a matte finish), changing the color of the finish, or removing a portion of the finish.

Figure 1B:
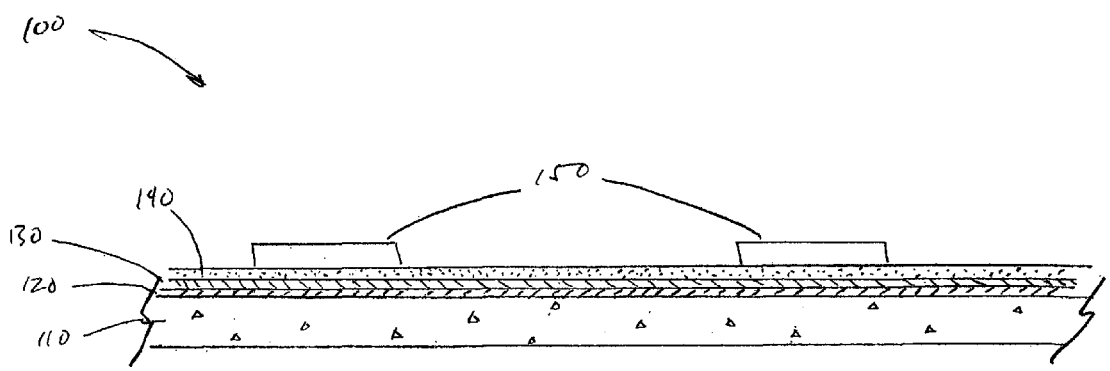

An alternative embodiment illustrated in FIG. 1B is similar to the embodiment illustrated in FIG. 1A, further comprising one or more optional spacers 150. Optionally, one or more spacers 150 are applied to provide additional shock absorption between fiber cement products. The spacer 150 preferably absorbs shock and does not concentrate forces to the extent that those forces damage the fiber cement product 110 or the finished surface 120.

Spacers 150 are preferably made from a material that does not damage or mar the surface of the finish 120. The thickness, size, and shape of the spacers 150 will depend on the factors including the compressibility and resilience of the spacer material, as well as the size, shape, and weight of the fiber cement product 110; the characteristics of the finish 120; the characteristics of the protective layer 140; and the anticipated storage, shipping, and handling conditions of the protected fiber cement product. Suitable spacer materials include solid polymeric materials, such as elastomers, rubber, or solid plastics; polymeric foams, such as polyethylene, polystyrene, or polyurethane foam; fabric-based materials, such as felt or fabric meshes; or any other relatively soft material, such as paper or wood-fiber mat.

The thickness of a spacer 150 is preferably from about 0.005 to about 0.1 inch, more preferably from about 0.01 to about 0.05 inch. The width of a spacer 150 is preferably from about 0.1 to about 2 inch, more preferably from about 0.3 to about 0.7 inch. The spacer 150 may be continuous strip, a discontinuous strip, or a series of predetermined shapes extending in a predetermined pattern over the surface of the protective layer. For example, as the product is run through a machine that applies spacers, the spacers may be applied in a pattern parallel to the feed direction. In another embodiment, the spacers are applied in a pattern perpendicular to the feed direction. In still another embodiment, the spacers are applied in a pattern at an angle to the feed direction. In still another embodiment, the spacers are applied in a different pattern. The preferred number of spacers 150 for each fiber cement product will depend on the properties of the spacers 150, as well as the size, shape, and weight of the fiber cement product. In one embodiment, at least 2 spacers 150 are used for each fiber cement product. In other embodiments, up to about 10, about 20, about 30, about 40, about 50, or more spacers 150 are used for each fiber cement product. The spacers may be pre-manufactured or manufactured during the packaging process, for example using a plastic extruder.

Spacers 150 may be manually or mechanically placed on top of protective layer 140 during the course of stacking a series of fiber cement products. Spacers 150 may also be pre-adhered to the protective layer 140, or to the backside of a fiber cement product 110. Spacers 150 may also be coextruded with the protective layer 140.

A second embodiment of a protected fiber cement product 200 according to the present disclosure is illustrated in cross section in FIG. 2. A finished fiber cement product is prepared by applying to a fiber cement product 110, a finish 120, as described above. A protective layer 140 and an optional adhesive layer 130 are also similar to those described above.

In the embodiment illustrated in FIG. 2, the protective layer 140 is applied to the finish 120 on the fiber cement product 110 such that a portion of the protective layer 140 is folded back upon itself, creating a folded spacer 150' that provides additional shock absorption. Detail A in FIG. 2 illustrates the flattened state of the spacer 150' in use. The spacer 150' reduces wear on the protective layer 140. The folded spacers 150' are formed when applying protective layer 140 to the surface of fiber cement product 110. In another embodiment, the folded spacers 150' are formed before applying the protective layer to the finish 120.

The protective layer 140 and an optional adhesive layer 130 are similar to those described above. The properties of the protective layer 140 will depend on the particular material from which the protective layer is made. The thickness, resilience, and compressibility of the protective layer 140 is predetermined to form a folded spacer 150' with the desired properties.

The spacers 150' may be formed parallel to the axis on which the fiber cement product is run through the packaging machine. In another embodiment, spacers 150' are formed perpendicular to the feed direction. In yet another embodiment, spacers 150' are formed at an angle to the feed direction. In still another embodiment, spacers 150' are formed at a plurality of angles to the feed direction.

The preferred number of spacers 150' for each fiber cement product will depend on the properties of the spacers 150', as well as the size, shape, and weight of the fiber cement product. In one embodiment, at least 2 spacers 150' are used for each fiber cement product. In other embodiments, up to about 10, about 20, about 30, about 40, about 50, or more spacers 150' are used for each fiber cement product.

A third embodiment of a protected fiber cement product 300 according to the present disclosure is illustrated in FIG. 3. A protective layer 140 is applied to the finish 120 on a fiber cement product 110 by imparting an electrostatic charge to the bottom surface of protective layer 140. The illustrated embodiment includes optional folded spacers 150' integrally formed by folding the protective layer 150' as described above. Detail A in FIG. 3 illustrates the flattened state of the spacer 150' in use. The folded spacers 150' are formed when applying protective layer 140 to the surface of fiber cement product 110. In another embodiment, the folded spacers 150' are formed before applying the protective layer to the finish 120.

The protective layer 140 is similar to the protective layer described above. The properties of a protective layer 140 will depend on the particular material from which the protective layer is made. The thickness, resilience, and compressibility of the protective layer 140 is predetermined to form a folded spacer 150' with the desired properties.

The spacers 150' may be formed parallel to the axis on which the fiber cement product is run through the packaging machine. In another embodiment, spacers 150' are formed perpendicular to the feed direction. In yet another embodiment, spacers 150' are formed at an angle to the feed direction. In still another embodiment, spacers 150' are formed at a plurality of angles to the feed direction.

The preferred number of spacers 150' for each fiber cement product will depend on the properties of the spacers 150', as well as the size, shape, and weight of the fiber cement product. In one embodiment, at least 2 spacers 150' are used for each fiber cement product. In other embodiments, up to about 10, about 20, about 30, about 40, about 50, or more spacers 150' are used for each fiber cement product.

Another embodiment (not illustrated) comprises spacers 150 similar to those described above in the embodiment illustrated in FIG. 1, either with or without folded spacers.

Figure 4:
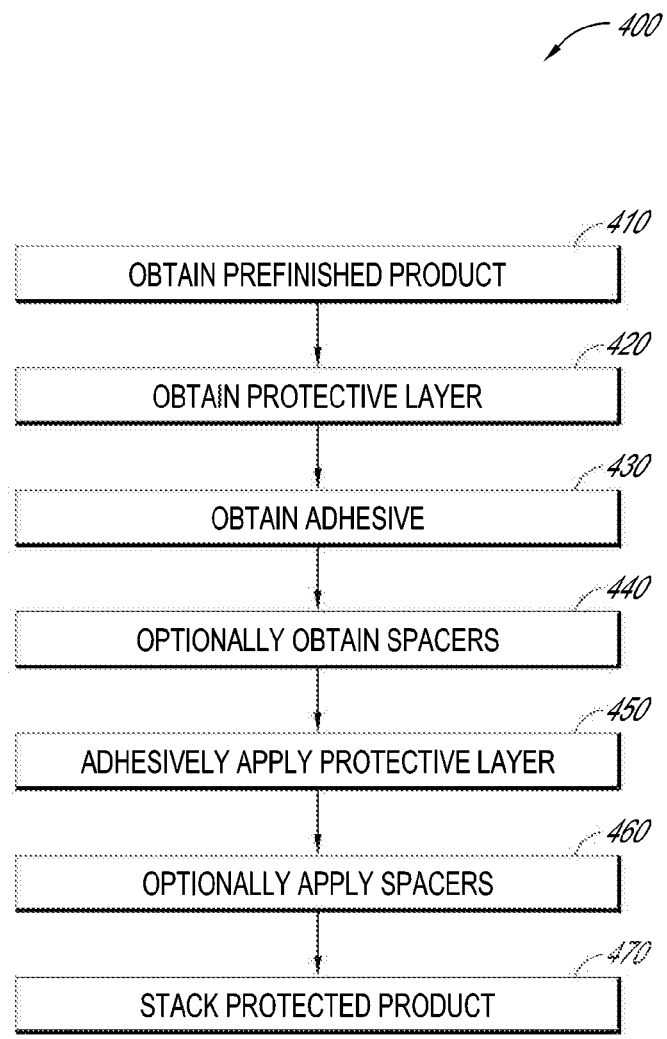
FIG. 4 illustrates an embodiment of the disclosed method for manufacturing a protected prefinished fiber cement product.

FIG. 4 illustrates an embodiment 400 of the disclosed method for packaging prefinished fiber cement products. In step 410, the user obtains a prefinished fiber cement product. In step 420, the user obtains a protective layer with a predetermined thickness, tensile strength, and impact strength. In step 430, the user obtains an adhesive with predetermined adhesive properties. As described above, the adhesive may be integrated into the protective layer in a monolayer film, may be preapplied to the protective layer in a multilayer film, or may be separate from the protective layer. In optional step 440, the user obtains spacers of predetermined thickness, compressibility, and resilience. In step 450, the protective layer is adhesively applied to a finished surface of the fiber cement product, forming a protected fiber cement product. In one embodiment, the protective layer is applied after the finish (e.g., paint) is fully cured. In another embodiment, the protective layer is applied while the finish is partially cured, but tack-free. Folded spacers are optionally formed as the protective layer is applied to the fiber cement product. In optional step 460, spacers are applied to the protected fiber cement product. In step 470, a plurality of protected fiber cement products are arranged in a stack. Preferably, the stack comprises a predetermined number of protected fiber cement products.

Figure 5:
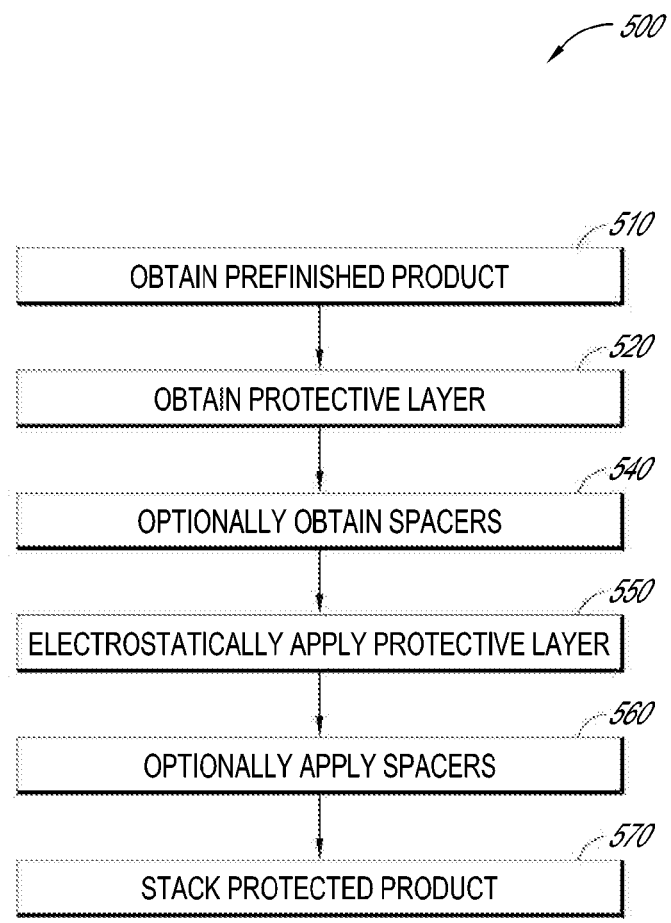
FIG. 5 illustrates an embodiment of the disclosed method for manufacturing a protected prefinished fiber cement product.

FIG. 5 illustrates yet another embodiment 500 of the disclosed method for packaging prefinished fiber cement products. In step 510, the user obtains a prefinished fiber cement product. In step 520, the user obtains a protective layer with a predetermined thickness, tensile strength, and impact strength. In this embodiment, the no adhesive is used. In optional step 540, the user obtains spacers of predetermined thickness, compressibility, and resilience. In step 550, the protective layer is electrostatically applied to a finished surface of the fiber cement product, forming a protected fiber cement product. Folded spacers are optionally formed as the protective layer is applied to the fiber cement product. In optional step 560, spacers are applied to the protected fiber cement product. In step 570, a plurality of protected fiber cement products are arranged in a stack. Preferably, the stack comprises a predetermined number of protected fiber cement products.

Figure 6:
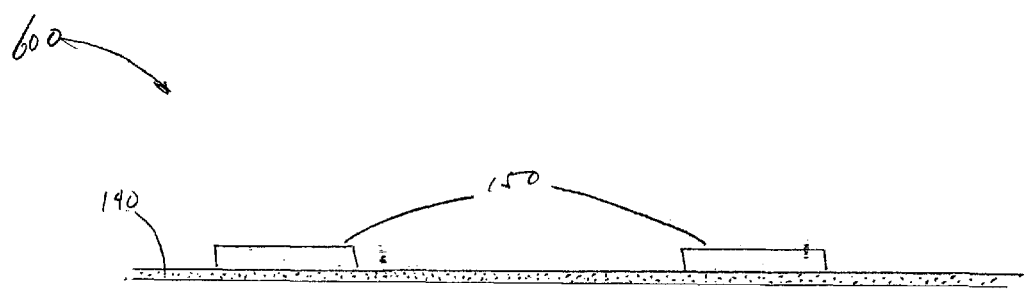
FIG. 6 illustrates in cross-section an embodiment of the disclosed protective layer with spacers bonded thereto.

FIG. 6 illustrates an embodiment 600 of the disclosed protective layer with spacers bonded thereto comprising a protective layer 140 and one or more spacers 150. The spacers are bonded to the protective layer by any means known in the art. In one embodiment, the spacers are bonded to the protective layer using an adhesive with predetermined adhesive properties. In another embodiment, the spacers are bonded to the protective layer thermally. Optionally, the finished protective layer is packaged in a form suitable for application to prefinished fiber cement products, for example, in a roll.

Figure 7:
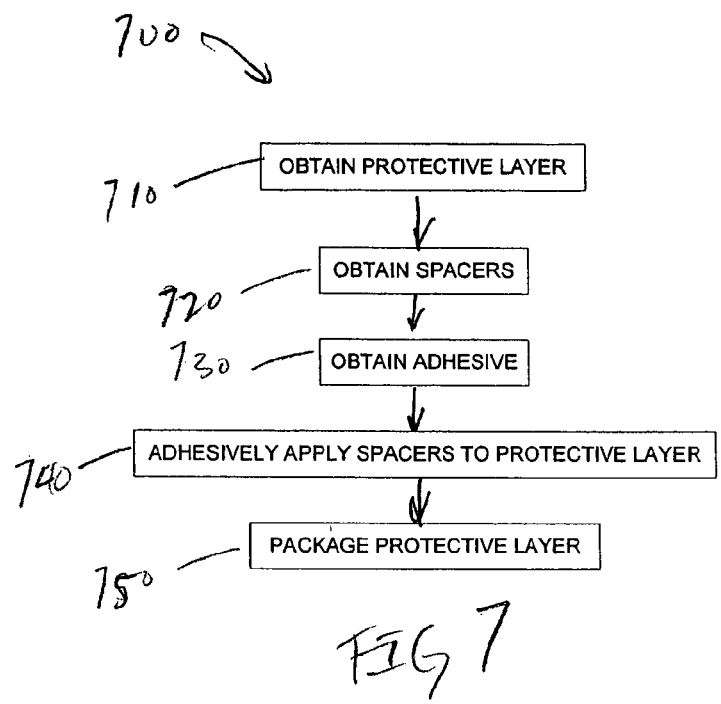
FIG. 7 illustrates an embodiment of the disclosed method for manufacturing a protective layer with spacers bonded thereto.

FIG. 7 illustrates an embodiment 700 of the disclosed method for manufacturing a protective layer with spacers 150 bonded thereto. In step 710, a protective layer with predetermined thickness, tensile strength, and impact strength is obtained. In step 720, spacers of predetermined shape, thickness, compressibility, and resilience are obtained. In optional step 730, an adhesive of predetermined bonding strength is obtained. In step 740, the spacers are bonded to a face of the protective layer. In embodiments using an adhesive, the spacers are bonded to the protective layer with the adhesive. In other embodiments, the spacers are bonded to the protective layer by other means, for example, thermally. In optional step 750, the finished protective layer is packaged in a form suitable for application to prefinished fiber cement products, for example, in a roll.

EXAMPLE 1

Plastic "Slip Sheet"

One face of a 5/16"×4"×6" fiber cement plank (Selected Cedarmill texture, James Hardie Building Products, Fontana, Calif.) was finished with two coats of paint (khaki brown, 15 gloss units, James Hardie Building Products, Fontana, Calif.). The first coat of paint was dried in a 60° C. oven for 4 min. The dry thickness was 0.002 to 0.004 inch. The second coat was dried in a 105° C. oven for 2 min. The dry thickness was 0.001 to 0.003 inch. A 0.0025" thick, clear polyethylene film (LDF 318, Dow Chemical) was tested as a slip sheet to protect the painted surface. The polyethylene film was applied to the painted surface of fiber cement after the fiber cement plank was removed from the paint-drying oven while the surface of the plank was about 90-140° F. A 1/16"-thick sheet of silicone rubber sheet (30 durometer, Shore A) was placed on top of the polyethylene film to accommodate the textured surface of the fiber cement plank. This assembly was pressed at 25 psi in a platen press, and the pressure released immediately. The polyethylene film did not acceptably adhere to the painted surface, delaminating with shaking or inversion. The film did not tear when removed. After removing the film, the finished surface of the plank had an uneven gloss and burnishing marks.

EXAMPLE 2

Blended Monolayer Film

A fiber cement plank was painted as described in EXAMPLE 1. A 0.002" thick monolayer film of blended polyethylene and ethylene acrylic acid (Integral 709 film, Dow Chemical) was laminated to the finished surface of the fiber cement plank as described in EXAMPLE 1. The film adhered to the finished surface, and did not delaminate with shaking or inversion, yet peeled-off easily. After removing the film, the finished surface of the plank had a uniform appearance with no burnishing, change in glossiness, or change in color. The film did not tear when removed. No adhesive residue was left on the finished surface and none of the finish was removed.

EXAMPLE 3

Storage Test of a Multilayer-Film Protected Plank

Fiber cement planks, 5/16"×8.25"×3' (Selected Cedarmill texture, James Hardie Building Products, Fontana, Calif.), were painted as described in EXAMPLE 1. A clear multilayer film of polyethylene coated with ethylene acrylic acid adhesive (DAF 708, 0.0009" thick, Dow Chemical) was applied to the finished surface of each plank just after emerging from the paint drying while the surface of the plank was about 90-140° F. On top of the film was placed a 1/8"-thick silicone rubber sheet (30 durometer, Shore A). This assembly was placed in a roller press moving at 50 ft/min at a pressure of 180 lb/linear inch. The film adhered to the finished surface and did not delaminate with shaking or inversion, yet peeled-off easily. After removing the film, the finished surface of the plank had a uniform appearance with no burnishing, change in glossiness, or change in color. The film did not tear when removed. No adhesive residue was left on the finished surface and none of the finish was removed.

Protected fiber cement planks were stacked on a 42"×13"×12' pallet. The pallet was completed with unprotected planks (840 total planks, 4 long by 5 across by 42 high). Some of the planks were stacked face-to-face and back-to-back, while others were stacked face-to-back. The pallet weighed about 2000 lb. A test assembly was constructed by stacking a dummy pallet weighing about 2000 lb on top of the test pallet. The test assembly was stored for 3 days. When disassembled, the film was torn and damaged. After removing the film, the finished surfaces of the planks showed serious wear including damage and scratches.

EXAMPLE 4

Storage and Transport of Film and Spacer Protected Planks

Fiber cement planks were painted and a multilayer film laminated to the finished surface of each plank as described in EXAMPLE 3. Two 0.08"×0.5" rubber strips were placed lengthwise on top of the film, approximately 1 inch away from each long edge of each plank. A test pallet of stacked planks was assembled as described in EXAMPLE 3. A test assembly of the test pallet and a dummy pallet was constructed as described in EXAMPLE 3. The test assembly was stored for 3 days. The test assembly was then placed on the forward end of the bed of a truck (test pallet on the bottom). A stack of two dummy pallets was placed behind and against the test assembly, and a single dummy pallet placed behind and against the stack of dummy pallets. The truck was driven 3000 miles. The planks were inspected upon return showing no damage. The plastic film was easily removed. After removing the film, the finished surface of the plank had a uniform appearance with no burnishing, change in glossiness, or change in color. The film did not tear when removed. No adhesive residue was left on the finished surface and none of the finish was removed.

Test results from EXAMPLE 1-EXAMPLE 4 are summarized in TABLE I. The "Peel-off Appearance" results were determined immediately after laminating the protective layer to the finished plank. In no case did the protective layer leave an adhesive residue on the finish or remove any part of the finish. The "Storage and Transport" results were after 3-days storage in EXAMPLE 3, and 3-days storage and 3000-miles transport in EXAMPLE 4.

TABLE I

| Example | Protective layer | Spacer | Peel-Off Appearance | Storage & Transport |
|---|---|---|---|---|
| 1 | 2.5 mil polyethylene | None | Uneven gloss, burnishing | N/A |
| 2 | 2.0 mil monolayer, blended polyethylene & ethylene acrylic acid | None | Uniform gloss, no burnishing | N/A |
| 3 | 0.9 mil multilayer, polyethylene coated with ethylene acrylic acid | None | Uniform gloss, no burnishing | Multilayer film damaged, finished surface scratched & damaged |
| 4 | 0.9 mil multilayer, polyethylene coated with ethylene acrylic acid | Two 80 mil × ½" rubber strips | Uniform gloss, no burnishing | Multilayer film intact, finished surface intact |

Samples of protected fiber cement planks prepared according to EXAMPLE 1-EXAMPLE 4 were stored on pallets outdoors in Fontana, Calif. Over the course of a year, the protective layers were periodically removed from the samples. In no case did the film tear upon removal. No adhesive residue was left on any of the finished surfaces of the samples, and none of the finish from any sample was removed.

The foregoing examples serve to illustrate the preferred embodiments and are not intended as limitations. Modifications and variations of the preferred embodiments will be apparent to those skilled in the art without departing from spirit of the invention, the scope of which is limited only by the appended claims.

What is claimed is:

1. An assembly of protected prefinished fiber cement products comprising a plurality of protected prefinished fiber cement articles arranged in a stack, wherein a protected prefinished fiber cement product comprises:
    a fiber cement product, a non-adhesive finish layer applied to the fiber cement product, and a removable multilayer protective layer consisting essentially of a separate polymer film and a separate adhesive layer, said adhesive layer of said multilayer protective layer adhered to the non-adhesive finish layer, wherein the adhesive layer is selected with predetermined adhesive properties to work in concert with the thickness and tensile strength of the protective layer such that the adhesive bonds weakly to the fiber cement product to allow the polymer film and the adhesive layer to be removed from the fiber cement product at the same time without tearing or leaving a residue on the non-adhesive finish layer, wherein the thickness of the protective layer is from about 0.0001 inch to about 0.08 inch and the tensile strength of the protective layer is from about 1200 to 4767 psi;
    the multilayer protective layer protects the finish layer from damage in storage, transport and handling,
    removing the multilayer protective layer leaves no residue on the non-adhesive finish layer and does not damage the non-adhesive finish layer, and
    the multilayer protective layer resists tearing on removal.

2. The protected prefinished fiber cement product of claim 1, wherein the protective layer is from about 0.0003 inch to about 0.03 inch thick.

3. The protected prefinished fiber cement product of claim 2, wherein the protective layer is from about 0.001 inch to about 0.01 inch thick.

4. The assembly of claim 1, wherein the protected prefinished fiber cement products are banded together.

5. The assembly of claim 1, wherein the protected prefinished fiber cement products are stacked on a pallet.

* * * * *